(12) United States Patent
Do

(10) Patent No.: US 10,596,501 B2
(45) Date of Patent: Mar. 24, 2020

(54) REUSABLE AIR FILTER DEVICE

(71) Applicant: AirThreds LLC, Denver, CO (US)

(72) Inventor: Mia Do, Broomfield, CO (US)

(73) Assignee: AIRTHREDS LLC, Denver, CO (US)

(\*) Notice: Subject to any disclaimer, the term of this patent is extended or adjusted under 35 U.S.C. 154(b) by 454 days.

(21) Appl. No.: 15/359,160

(22) Filed: Nov. 22, 2016

(65) Prior Publication Data

US 2017/0348624 A1 Dec. 7, 2017

Related U.S. Application Data

(60) Provisional application No. 62/345,264, filed on Jun. 3, 2016.

(51) Int. Cl.
*B01D 46/00* (2006.01)
*B01D 39/08* (2006.01)
*B01D 46/10* (2006.01)
*B01D 46/42* (2006.01)

(52) U.S. Cl.
CPC ....... *B01D 46/0005* (2013.01); *B01D 39/083* (2013.01); *B01D 46/0032* (2013.01); *B01D 46/10* (2013.01); *B01D 46/4227* (2013.01); *B01D 2239/0435* (2013.01)

(58) Field of Classification Search
CPC ............. B01D 46/00; B01D 46/0005; B01D 46/0016; B01D 46/10; B01D 46/4227; B01D 39/00; B01D 39/083; B01D 2239/0435
USPC .................................................. 55/490–519
See application file for complete search history.

(56) References Cited

U.S. PATENT DOCUMENTS

| | | | |
|---|---|---|---|
| 4,959,087 A | 9/1990 | Kappernaros | |
| 4,979,531 A * | 12/1990 | Toor | E04H 15/60 135/114 |
| 5,527,568 A | 6/1996 | Boone et al. | |
| 5,690,719 A | 11/1997 | Hodge | |
| 5,947,815 A | 9/1999 | Danforth | |
| 6,047,500 A | 4/2000 | Caplette | |
| 6,077,336 A | 6/2000 | Ulrich et al. | |
| 6,302,250 B1 | 10/2001 | Sadow et al. | |
| 6,338,340 B1 * | 1/2002 | Finch | A62B 18/084 128/205.27 |
| 6,514,324 B1 | 2/2003 | Chapman | |
| 6,723,150 B2 | 4/2004 | Parker | |
| 6,843,834 B2 | 1/2005 | Schumacher | |
| 6,878,057 B1 | 4/2005 | Calloura | |
| 7,097,692 B2 | 8/2006 | Southland et al. | |
| D562,589 S | 2/2008 | Mellon | |

(Continued)

OTHER PUBLICATIONS

Notice of References in U.S. Appl. No. 29/581,676, dated Jan. 22, 2018, 1 page.

(Continued)

*Primary Examiner* — T. Bennett McKenzie
(74) *Attorney, Agent, or Firm* — Sheridan Ross PC

(57) ABSTRACT

An air filtration device is provided. The device comprises a frame member with a detachable filter element, and the filter element comprises a fabric, textile, or similar pliable material that is operable to be washed by various methods. Methods and devices include a filter element and various attachment mechanisms for securing the filter element to a frame and selectively removing the filter element for cleaning and replacement purposes.

6 Claims, 31 Drawing Sheets

(56) References Cited

U.S. PATENT DOCUMENTS

| | | |
|---|---|---|
| D605,275 S | 12/2009 | Kawano et al. |
| 8,016,921 B2 | 9/2011 | Hassell et al. |
| D665,851 S | 8/2012 | Davis |
| D689,490 S | 9/2013 | Halsinger et al. |
| 8,641,794 B2 | 2/2014 | Gillilan |
| 8,721,775 B2 | 5/2014 | Chesebrough |
| D738,998 S | 9/2015 | Laver |
| D745,511 S | 12/2015 | Lee et al. |
| D757,299 S | 5/2016 | Altieri |
| D763,848 S | 8/2016 | Choo et al. |
| D782,473 S | 3/2017 | Hong et al. |
| D789,924 S | 6/2017 | Akana et al. |
| 2003/0056442 A1 | 3/2003 | Gerard |
| 2005/0103880 A1 | 5/2005 | Taite |
| 2009/0038480 A1* | 2/2009 | Garman ............ B01D 46/0016 96/414 |
| 2009/0078121 A1 | 3/2009 | Hepburn |
| 2012/0060695 A1 | 3/2012 | Hepburn |

OTHER PUBLICATIONS

Amendment and Response to an Official Action in U.S. Appl. No. 29/581,676, dated Jul. 10, 2019, 25 pages.

\* cited by examiner

REUSABLE AIR FILTER DEVICE

This U.S. Non-Provisional Patent Application claims the benefit of priority from U.S. Provisional Patent Application Ser. No. 62/345,264, filed Jun. 3, 2016, the entire disclosure of which is hereby incorporated by reference.

FIELD

Embodiments of the present disclosure relate generally to air filtration devices and air filters. More specifically, embodiments of the present disclosure relate to air filtration devices comprising various features and wherein at least portions of the filtration devices are removable or detachable and the devices are at least one of washable and replaceable.

BACKGROUND

A significant percentage of the world's population suffers from various respiratory disorders, such as asthma, hay fever, and common allergies. Such ailments are frequently caused or made worse by airborne microbes and particulates in a given environment. Air quality of indoor environments is commonly the main cause of such respiratory illnesses, even when indoor environments comprise one or more air filtration devices or methods.

Indoor Air Quality ("IAQ") is critical to human comfort and health. As the need for IAQ increases, a plethora of air cleaning devices are brought to market with the focus on increased efficiency. The U.S. Environmental Protection Agency has concluded that the best method to improve IAQ is to control the source and provide proper ventilation by letting clean air flow through from the outside. However, air filtration devices can also be used in conjunction with this method to aid the effectiveness of IAQ. Filters with a high Minimum Efficiency Report Value ("MERV" rating) focus on efficiency, whereas effectiveness focuses on the overall cleaning power or efficacy of surfaces and filters.

Most modern indoor spaces are temperature controlled by systems that draw air from the indoor environment to a Heating-Ventilation-Air-Conditioning ("HVAC") unit including a furnace, air conditioner, and/or similar device(s). After heating or cooling, air is typically forced through supply ducts leading to supply vents within the interior space to maintain a desired temperature and/or humidity level within the interior space. During this process, air is generally directed through one or more filters to trap particulate, dust, dirt and germs and remove such pollutants from the air flow. The filter(s) may be provided at various locations within a system.

Microbes, such as mold, bacteria and fungus often grow within the ducts, particularly if moisture becomes trapped in the air supply system. These microbes, as well as various other particulates and pollutants, may be delivered to an associated indoor environment and enter the lungs of inhabitants. As noted above, these airborne particles and microbes are unhealthy and will cause respiratory illnesses including, but not limited to, asthma and bronchitis.

Common HVAC filters were originally designed to protect a furnace from particles in the air, thereby increasing the usable life of a furnace and preventing damage to the same. However, as the awareness of indoor air quality and associated health risks increased, commercial focus has been placed on efficiency of HVAC filters. Many systems, however, overlook the effectiveness of IAQ devices.

The EPA has outlined various issues with existing furnace filtration products. These issues include, for example, mold growth, dust cake buildup, leaks, air mixing, and other issues that prevent efficient and effective air filtration.

Prior art air filtration devices generally comprise disposable filter elements. Such devices include, for example, various commercially air filters available from FILTRETE™. Such devices are generally intended to be inserted into a pre-existing air filtration or HVAC system and filter a certain amount of air until they are intended to be removed, discarded, and replaced. Such devices are designed and intended to operate for a limited amount of time and thereafter become permanent waste to be conveyed to a landfill or recycling operation, and immediately replaced by another filter.

Prior art air filtration devices typically comprise a or textured ridged surface attached to a frame that is not easily removed from the surface once assembled. The filter media is typically made up of non-woven thick spongy porous fibers designed to capture high quantities of dust. Such devices are not machine washable or machine dryable. Additionally, existing packaging, shipping methods, warehousing methods and retail display devices all require additional space and careful handling due to the nature of the fully assembled frames and fragile media within.

Accordingly, there exists a long-felt and unmet need for an air filtration device that can remove various particulates, pollutants, and microbes from an air flow. There further exists a need to provide such a filter that is also a reusable device, wherein the reusable device is washable and wherein waste is significantly reduced. There is also a need for enhanced packaging, shipping, and storing methods for air filtration devices wherein packing efficiency is increased and overall required space is reduced.

U.S. Patent Application Publication No. 2012/0060695 to Hepburn, which is hereby incorporated by reference in its entirety, discloses a high-velocity air filter that is washable and reusable. Various features and devices of Hepburn are contemplated for use and inclusion with various embodiments of the present disclosure. Hepburn, however, fails to teach or disclose features of the present invention including, but not limited, various features of a detachable and machine-washable component for an air filter device as shown and described herein.

SUMMARY

Accordingly, there has been a long-felt and unmet need to provide an air filtration device that is suitable for use with an existing HVAC system, wherein the device provides enhanced cleaning efficiency and effectiveness, and wherein the device can be cleaned and reused at little or no additional cost.

Embodiments of the present disclosure provide a filter device for various systems. Although various embodiments of the present disclosure contemplate air filters for use with pre-existing HVAC devices, including forced air heating and air conditioning units, it is contemplated that filter devices, features, and structures as shown and described herein may be provided or useful in combination with any number of systems or devices. It will therefore be recognized that the embodiments of the present disclosure are not limited to any particular intended use. Filter devices of the present disclosure may be provided in engines (e.g. automobile engines), face masks, air movers, and various devices and systems where air filtration is needed or desired. In further embodiments, devices of the present disclosure are useful for and operable to filter a liquid such as water. For example, certain embodiments contemplate a filter device that is removable and washable, and that is operable to filter water in a pool water filtration system. Such embodiments contemplate providing filter devices with geometries, proportions, and arrangements to fit or retrofit conventional pool filter devices.

In various embodiments, devices of the present disclosure comprise a removable cover portion for an air filter device. In certain embodiments, the removable cover portion comprises a zipper, one or more buttons, a hook-and-eye closure, or similar closure members that are operable to be selectively secured and unsecured from a remainder of the filter device. It is contemplated that the cover portion is sized and adapted to be applied over and/or in communication with an existing commercial air filter including, for example, various commercially-available FILTRETE™ air filter devices. In one embodiment, a filter member is provided comprising a covering operable to receive and surround at least one of a frame and a preexisting filter. Accordingly, filter members of the present disclosure may comprise various dimensions and proportions as may be needed or desirable to surround or contain a preexisting filter.

In various embodiments, filter devices and members of the present disclosure comprise devices that are modular or separable such that at least a portion of the filter device and/or member may be easily washed or cleaned. For example, in certain embodiments a slip cover is provided that acts as a filter member to trap particulates and other substances and remove the to same from a volume of moving air.

In one embodiment, an air filter device is provided comprising a substantially rectangular frame to provide structural support. The substantially rectangular frame comprises a perimeter that at least partially defines an internal area, the internal area operable to be provided in or at least partially overlap a flow path of a fluid.

In one embodiment, a filter device is provided comprising a frame. The frame may comprise any number of geometric shapes and combinations thereof. In a preferred embodiment, the frame comprises a rectangular frame member suitable for insertion into preexisting air flow devices and ducting elements. The frame comprises at least one attachment interface for receiving and securing a removable filter component, the removable filter component preferably comprising at least one of a filter fabric and a membrane.

In various embodiments, a method of cleaning an air filtration device is provided. In one embodiment, a method comprises providing a frame member comprising a length and a height, the frame member at least partially defining an area through which an air flow is to be provided, a filter member extending in at least a portion of the area, the filter member comprising a flexible material, and wherein the filter member is secured to the frame member by a connection. The filter member is removed from the frame member by disconnecting the connection, and is washed by immersing the filter member in at least one of water and a cleaning solution. The filter member is thereafter reconnected to the frame member by reconnecting the connection. In various embodiments, the connection comprises at least one of a zipper, a hook-and-loop closure, a snap, a magnet, an elastic member, and a clamp.

In certain embodiments, a filter member comprises a stretchable fabric. For example, in some embodiments, a filter member comprises a lycra or spandex. In such embodiments, it is contemplated that the filter member comprises a dimension or surface area in an un-tensioned or unstressed state that is less than a stretched dimension and/or a dimension or surface area of a frame member. For example, in one embodiment, a filter member is provided that comprises an unstressed or original surface area that is approximately 80% of its surface area when the filter member is stretched and provided in a position of use in combination with a frame. In various embodiments, however, it is contemplated that the filter member comprises an original dimension of between approximately 30% and 110% of a dimension or area provided by a frame. Preferably, the original dimension of the filter element is between approximately 50% and approximately 90% of a dimension or area provided by the frame. The Applicant has determined that such relative dimensions provide a desirable combination of air flow and air filtration when the filter element is stretched and/or applied in a position of use.

In various embodiments, a frame member for an air filter is provided wherein the frame member is adjustable in at least one dimension. Adjustable frame members of the present disclosure enable a user to customize a frame member for a desired application and/or duct size. Additionally, adjustable frame members of the present disclosure provide for ease of packing, shipping, etc. of frame members, wherein frame members may be broken down or condensed for shipment and storage (for example). In certain embodiments, the adjustability of the frame member is provided by the modular nature of the frame member wherein a plurality of different frame portions or frame members may be selectively connected in a variety of desired sizes and/or orientations.

In various embodiments, a package is providing comprising a plurality of air filter devices and/or air filter elements, and wherein at least one additional or supplemental air filter element is provided to a user for use when a first air filter element is undergoing washing or cleaning operations.

In one embodiment, an air filtration device is provided, the device comprising a frame member comprising a length and a height, and least partially defining an area through which an air flow is to be provided. A filter member extends in at least a portion of the area, and the filter member comprises a flexible material, and the filter member is secured to the frame member by a connection. The filter member is selectively removable from the frame member and is operable to be washed in the presence of water.

In various embodiments, a machine-washable furnace air filter device is provided. The device comprises a frame and removable filter portion, wherein the filter portion is removable and may be placed in a washing machine and/or dryer. The filter portion is operable to withstand temperatures above 100 degrees F., which aids in killing mold and bacteria that may reside on the filter device after use. The filter portion is secured to the frame portion by one or more members, such as a zipper or a plurality of snaps (for example).

In one embodiment, an air filtration device is provided. The device comprises a frame comprising a length and a height, and wherein the frame comprises a plurality of selectively interconnectable frame members that form a substantially rectilinear frame when provided in an assembled state. The frame at least partially defines an air flow path, such as an area through which HVAC air flow is intended to pass. A filter member is provided that comprises a flexible woven textile material, a first side, a second side, a length, a height, and an internal volume provided between the first side and the second side. The length and the height of the filter member are equal to or greater than the length and the height of the frame. The filter member further comprises an opening extending along at least a portion of the height of the filter member and at least a portion of the length of the filter member, and wherein the opening is sized and operable to receive the frame such that the frame is operable to be provided within the internal volume of the filter member. The filter member is operable to be separated from the frame and the flexible woven textile material of the filter member is operable to withstand liquid saturation and elevated temperatures within a conventional washing machine.

In another embodiment, an air filtration device is provided that comprises a frame having a length and a height. The frame comprises a plurality of selectively interconnectable frame members that form a substantially rectilinear frame when provided in an assembled state. The frame at least partially defining an air flow path for air that is to be filtered. A filter member is provided that comprises a flexible woven textile material, a first side, a second side, and an internal volume provided between the first side and the second side. The filter member further comprises an opening, and wherein the opening is sized and operable to receive the frame such that the frame is provided within the internal volume of the filter member. The filter member is operable to be separated from the frame, and the flexible woven textile material of the filter member is operable to withstand liquid saturation and elevated temperatures.

In yet another embodiment, an air filtration device is provided that comprises a frame having a length and a height. The frame comprises a plurality of selectively interconnectable frame members that form a substantially rectilinear frame when provided in an assembled state. The selectively interconnectable frame members comprise at least one elastic cord to facilitate assembly of the frame. The frame at least partially defines an air flow path when provided in an assembled state. A substantially rectangular filter member is provided that comprises a flexible woven textile material, a first side, a second side, a length, a height, and an internal volume provided between the first side and the second side. The length and the height of the filter member are equal to or greater than the length and the height of the frame and the frame is operable to be received within the filter member. The filter member further comprises an opening extending along at least a portion of the height of the filter member and at least a portion of the length of the filter member, and wherein the opening is sized and operable to receive the frame such that the frame is operable to be provided within the internal volume of the filter member. The filter member is operable to be separated from the frame and wherein the flexible woven textile material of the filter member is operable to withstand liquid saturation and elevated temperatures within a conventional washing machine, for example.

In various embodiments, a method of cleaning and reusing an air filtration is provided. In one embodiment, a method of cleaning an air filtration device is provided, the method comprising: providing a frame member comprising a length and a height, the frame member at least partially defining an area through which an air flow is to be provided, a filter member extending in at least a portion of the area, the filter member comprising a flexible material, and wherein the filter member is secured to the frame member by a connection; removing the filter member from the frame member by disconnecting the connection; washing the filter member by immersing the filter member in at least one of water and a cleaning solution; and connecting the filter member to the frame member by reconnecting the connection.

In certain embodiments, a filter device is provided comprising a filter fabric. The filter fabric comprises a woven or knitted textile material including various textiles used in activewear apparel. Filter fabrics of the present discourse may be washed and replaced, as opposed to discarded and replaced with a new device. Since the filter fabric can be cleaned at-will, it is contemplated that filter devices of the present disclosure be cleaned and replaced more frequently than existing devices are replaced. For example, devices of the present disclosure may be cleaned monthly as opposed to replacing a disposable filter every few months or with a change in seasons. Existing washable electrostatic devices typically contemplate cleaning a filter using a hose or sink and simply involve rinsing the filter fabric. Even where such devices are capable of withstanding being subjected to water, they are typically not capable of withstanding the rigors of conventional washing machines and/or dryers. The ability of devices of the present disclosure to withstand the stresses of washing machines and dryers provides for a device with an increased resistance to mold, bacteria, and other harmful contaminants that could get blown back into an environment that is intended to be cleaned. Fabrics and textiles suitable for use with filter elements of the present disclosure include, but are not limited to, polyester, cotton, wool, bamboo, acrylic, nylon, rayon, spandex, acetate, lastex, orlon, Kevlar, and various combinations of the same.

In certain embodiments, a filter member comprises a 100% polyester material with a weight of between approximately 5.5 and 10.0 ounces per square yard. In a preferred embodiment, a spacer mesh fabric is provided and is knitted as a single fabric to produce a three-dimensional texture that replaces lamination of foam and neoprene. The knitted structure of the fabric creates space and loft within the fabric, thereby allowing for breathability for moisture to evaporate.

In one embodiment, an air filtration device is provided. The device comprises a frame member having a length and a height, and wherein the frame member at least partially defines an area through which an air flow is to be provided. A filter member extends in at least a portion of the area, wherein the filter member comprises a flexible material. The flexible material is preferably a woven or knitted material, in contrast with various existing technologies that provide a non-woven filter element. The filter member is secured to the frame member by a connection. The filter member is selectively removable from the frame member, and the filter member is operable to be washed in the presence of water.

DETAILED DESCRIPTION

Figure 1:
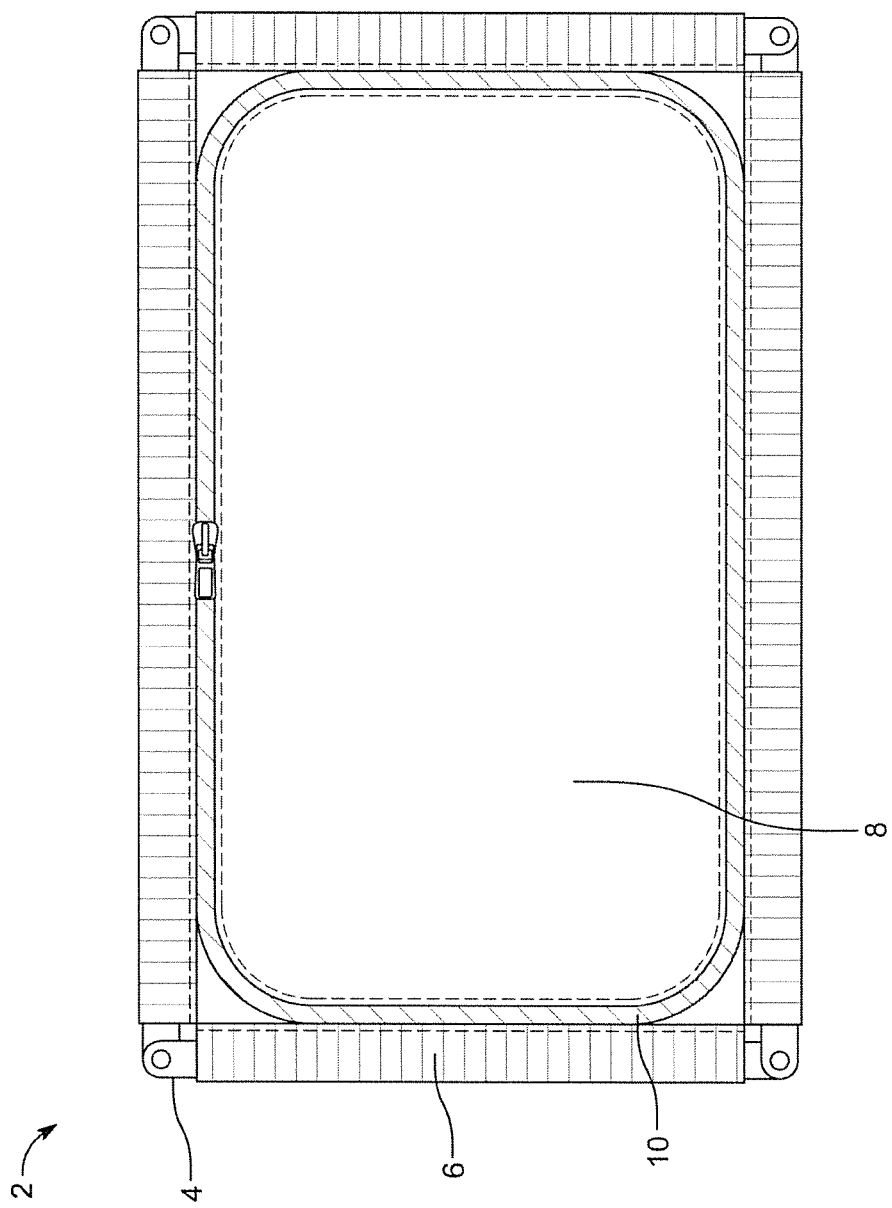
FIG. 1 is a front elevation view of an air filter device according to one embodiment of the present disclosure.

FIG. 1 is a front elevation view of an air filter device 2 according to one embodiment of the present disclosure. As shown in FIG. 1, the air filter device 2 comprises a frame member 4, wherein the frame member 4 comprises a substantially rectangular member that at least partially defines a perimeter or outer boundary of the air filter device 2. In the depicted embodiment, a cover member 6 is provided on at least a portion of the frame member 4. In various embodiments, the cover member 6 comprises a textile that is wrapped around or otherwise secured to at least a portion of the frame member 4. In the depicted embodiment, four linear side members of the frame member 4 are covered or provided with the cover member 6. The air filter device 2 comprises a filter member 8. The filter member 8 is removable from a remainder of the air filter device 2 to facilitate cleaning and/or replacement of the filter member 8 and wherein at least a portion of the air filter device 2 is provided as a reusable device. In the embodiment of FIG. 1, the filter member 8 is removably secured to the cover member 6 by an attachment means. In the depicted embodiment, the attachment means comprises a zipper 10 that extends around a substantial majority of an interior perimeter of the frame member 4 as shown. The filter member 8 is thus removable from the cover member 6 and the frame member 4 by manually separating a zipper 10 that extends around the filter member 8 and connects the filter member 8 to the cover member 6 and/or the frame member 4. The filter member 8 comprises a soft, pliable member that may be washed by means of conventional washing machines, for example. Cleaned or unused filter members 8 may be easily reattached to the air filter device by connecting a zipper portion provided on the cover member 6 to a second zipper portions provided on the filter member 8.

In various embodiments, including but not limited to the embodiment shown in FIG. 1, a frame member 4 of an air filter device comprises a substantially rigid frame member. The frame member is contemplated as comprising one or more materials that is lightweight, durable, reusable, and capable of providing sufficient rigidity and strength to the filter device 2. For example, in various embodiments, a frame member comprises at least one of a plastic, polypropylene, polyethylene, steel(s), aluminum, wood, resin, carbon fiber, and combinations thereof. The frame member(s) may be of any desired size. It is contemplated, however, that frame members of the present disclosure are provided in standard sizes that comprise a length and width to be received within furnace features and ducting elements of known, standard, and/or preexisting sizes as will be recognized by one of ordinary skill in the art.

In various embodiments, the filter elements of the present disclosure are contemplated as comprising foam, pleated paper or fabric, sheer spandex, rayon, poly-lycra, lightweight poly-spandex, and/or spun fiberglass, or various combinations thereof. In other embodiments, the filter element comprises a fabric such as a traditional textile capable of enduring numerous washings. The textile may comprise or consist of spandex. Silver fiber comprising antimicrobial properties is contemplated as being provided in filter elements of various embodiments. In further embodiments, terry cloth or cloth members comprising one or more pleats are provided to increase a filtration surface area. In certain embodiments, a filter fabric is provided that comprises woven or knitted textiles that are durable and comprise machine washability/dryability, flexibility and ability to cost effectively retain treatments such as antimicrobial, activated carbon & dust attraction. In certain embodiments, natural fibers are provided. Natural fibers include, for example, organic cotton fibers, terry cloth, bamboo fibers or textiles, etc. Knitted textiles of the present disclosure allow for a stretching of the filter fabric and therefore provide control of the fabric pores, depending on the amount of stretch provided, which will increase or decrease air flow and particle size capture. The durability of the fabric(s) allows the filter to withstand the rigors of washing machine gyrations, temperatures above 100 degrees F. to thoroughly kill and rinse away mold and pollutants, and other stresses applied to the fabric.

In various embodiments, the filter elements are provided with a static electric charge to attract particulates that are to be removed from an air flow. The present disclosure contemplates various methods of using and replacing an air filter wherein a filter member is removed, washed, and sprayed with one or more materials to apply or re-apply a static electric charge to the filter element prior to reinstallation.

Figure 2:
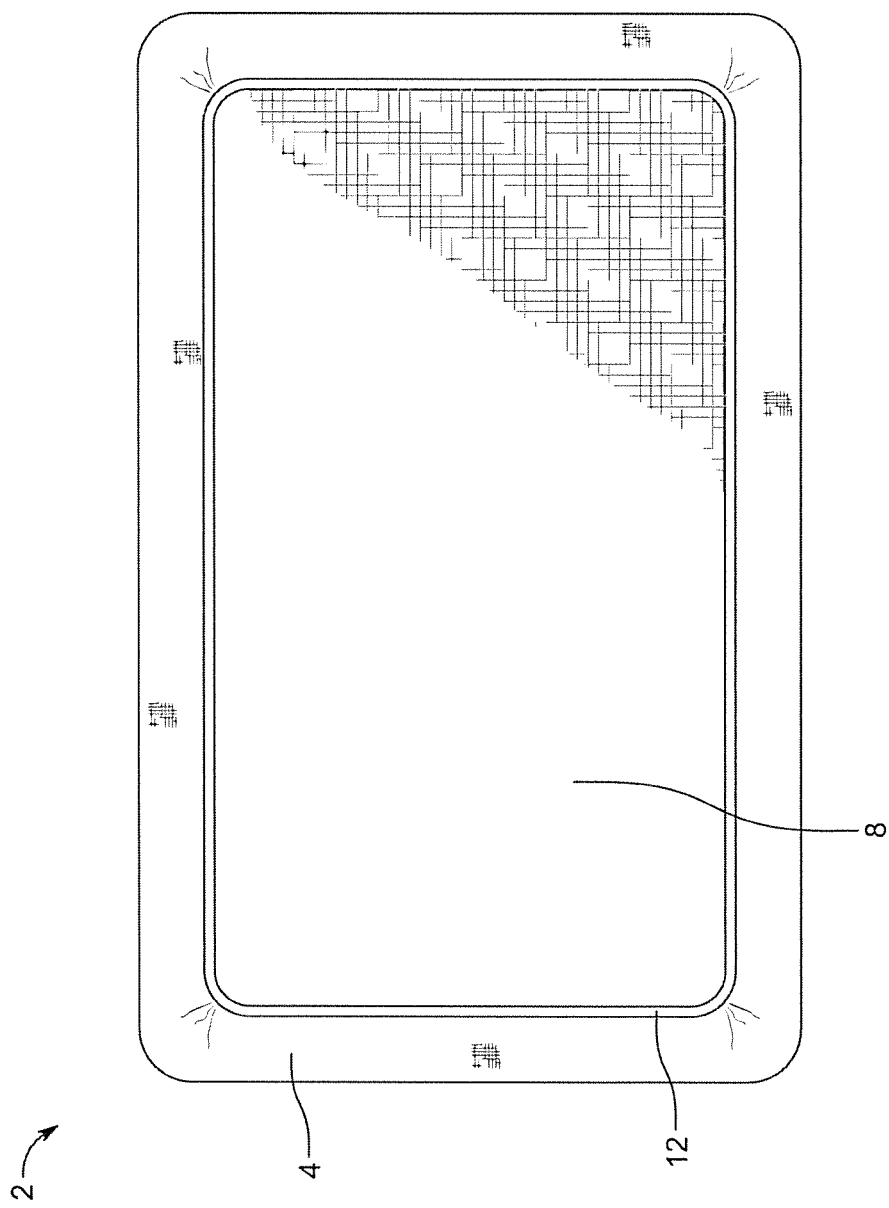
FIG. 2 is a rear elevation view of an air filter device according to one embodiment of the present disclosure.

FIG. 2 is a rear elevation view of an air filter device 2 according to another embodiment of the present disclosure. As shown in FIG. 2, the air filter device 2 comprises a frame member 4 and a filter member 8. The filter member 8 of FIG. 2 comprises a filter fabric with an elastic member 12 extending around an edge or perimeter of the filter member 8. The elastic member 12 creates a constriction or biasing force around the outer perimeter of the filter member and is provided to secure the filter member 8 to the frame member 4. The elastic member 12 may be manually stretched or expanded to enlarge an outer perimeter or circumference of the filter member 8 and placed around the frame member 4. When force or tension is removed from the elastic member 12, the elastic member constricts around the frame member 4 and secures the filter member 8 to the frame member 4. The combination of the elastic member 12 and the frame member 4 as shown in FIG. 2 thus provide a quick and efficient means of placing a filter member 8 in communication with a remainder of an air filter device 2. The filter member 8, which is essentially a cover member with an elastic element, is easily positionable on and removable from the frame member 4 such that the filter member 8 may be easily removed and washed and/or replaced. Filter members 8 according to various embodiments of the present disclosure preferably comprise pliable members that are devoid of rigid elements or supports and wherein the filter members 8 may be placed in a conventional washing machine (for example) for ease of cleaning. In various embodiments, filter members are contemplated as comprising support structures such as netted fabric, cord or mesh; ripstop nylon; metallic threads; and various other features or devices to provide for tensile strength and structural support, while still providing a flexible or pliable filter member 8 that is washable in a similar manner as a garment or textile member.

Figure 3:
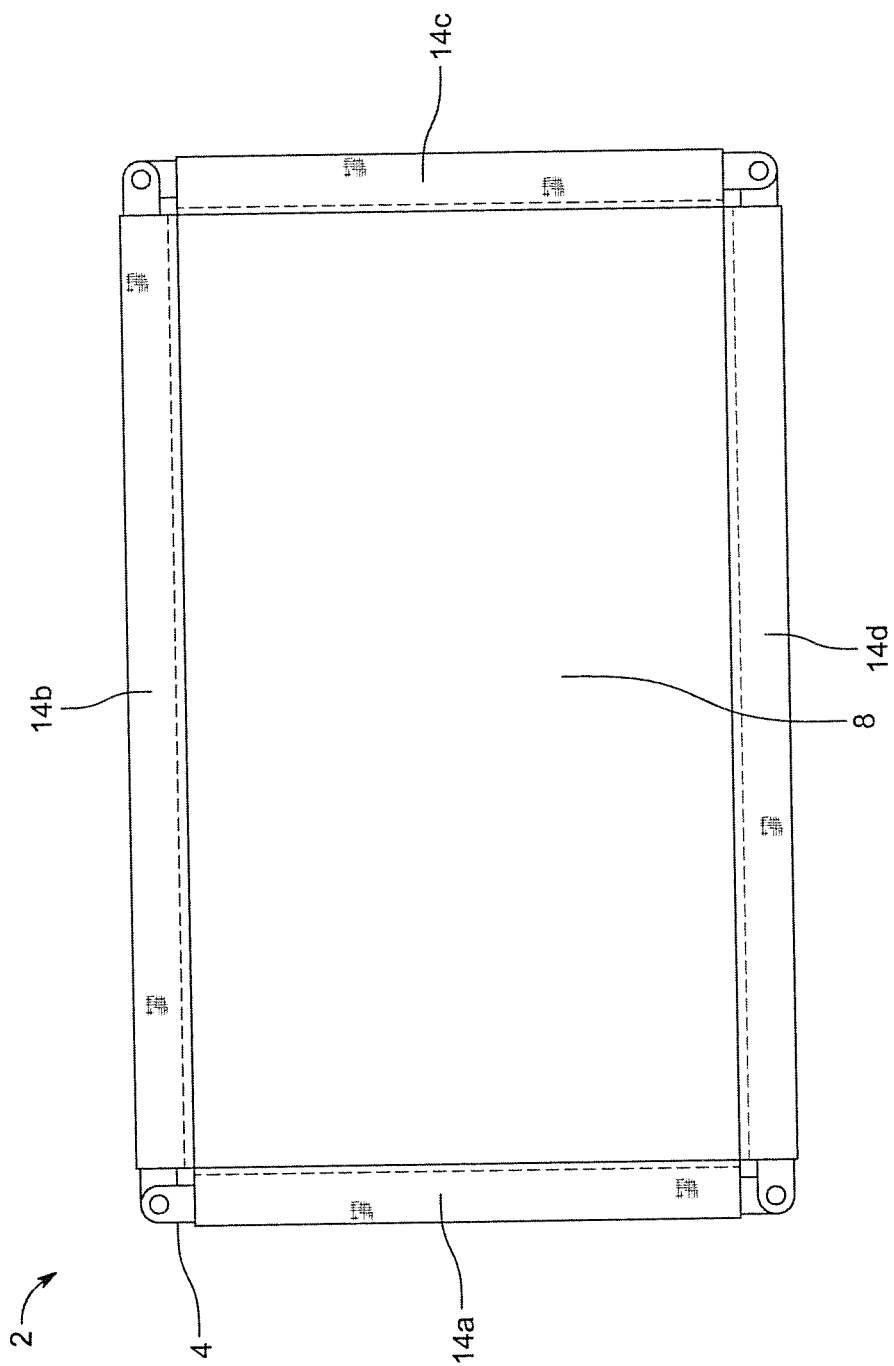
FIG. 3 is a rear elevation view of an air filter device according to one embodiment of the present disclosure.

FIG. 3 is a rear elevation view of an air filter device 2 according to another embodiment of the present disclosure. As shown, the air filter device 2 comprises a frame member 4 and a filter element 8. In the embodiment shown in FIG. 3, the filter element 8 preferably comprises a surface area and/or perimeter that is larger than the surface area and/or perimeter of the frame member 4. A portion of the filter element 8 extends over the frame member 4 and is secured thereto. Specifically, and as shown in FIG. 3, the filter element 8 comprises a plurality of flaps or panels 14a, 14b, 14c, 14d that may be wrapped or otherwise extend over the frame member and are secured in the position shown in FIG. 3. The filter element 8 and/or the frame member 4 are contemplated as comprising hook-and-loop closure elements to selectively secure the panels 14a, 14b, 14c, 14d to the frame member 4. In certain embodiments, at least a portion of the frame member 4 is provided with a hook-and-loop portion and at least portions of the filter element 8 comprises at least one corresponding or opposing hook-and-loop portion such that the frame member 4 and the filter element 8 may be selectively secured together and separated. In the embodiment provided in FIG. 3, the panels comprise one or more folds that stitched or otherwise secured back to themselves, thereby creating channels for receiving frame portions.

Figure 4:
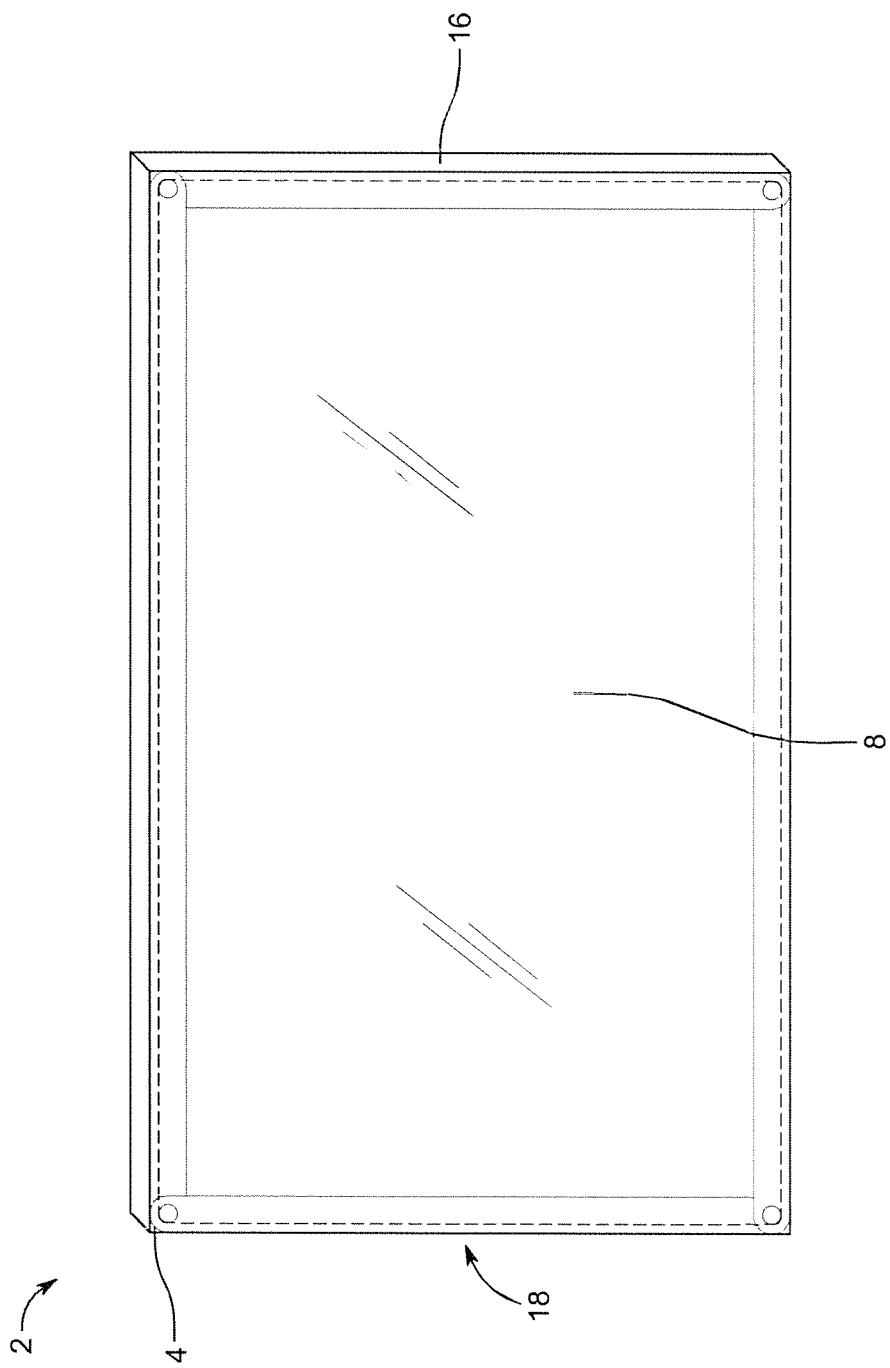
FIG. 4 is a front elevation view of an air filter device according to one embodiment of the present disclosure.

FIG. 4 is a front elevation view of an air filter device 2 according to another embodiment of the present disclosure. As shown in FIG. 4, a filter element 8 is provided in combination with a frame member 4. The filter element 8 of the embodiment of FIG. 4 comprises a slip cover type filter element, wherein the filter element 8 comprises a first end 16 and a second end 18. At least one of the first end 16 and the second end 18 comprises an opening for receiving a frame member 4, and the frame member 4 is operable to provide a shape and structural support to the filter element 8. In a preferred embodiment, a first end 16 of the filter element 8 comprises an elongate opening and the second end 18 comprises a sealed end, wherein a frame may be inserted into the filter element 8 through the first end 16. The filter element 8 thus comprises a first and second filter layer provided on opposing sides of the frame member 4, and wherein the frame member 4 is encased in the filter element. In certain embodiments, the first end 16 is provided with one or more closure members to secure or close the elongate opening of the first end 16. For example, in one embodiment, the first end 16 comprises at least one of a zipper, a snap, a hook-and-loop closure, and a button wherein the elongate opening may be at least partially sealed after insertion of a frame member 4 within the filter element 8. In preferred embodiments, the frame member 4 comprises a substantially rectangular structural member defining a central area that is devoid of additional elements, including filter elements. In alternative embodiments, the frame member 4 is contemplated as comprising a pre-existing frame and filter element including, for example, a commercially available filter from FILTRETE™. In certain embodiments, it is contemplated that an opening (e.g. a zipper opening) extends along at least a portion of at least two sides of the device. For example, and as opposed to embodiments wherein the filter device comprises three closed or sealed sides of a rectangle and fourth side comprising an opening, it is contemplated that a zipper may extend along a first side and wrap around or extend onto at least a portion of an adjacent, perpendicular side of the filter device.

Figure 5:
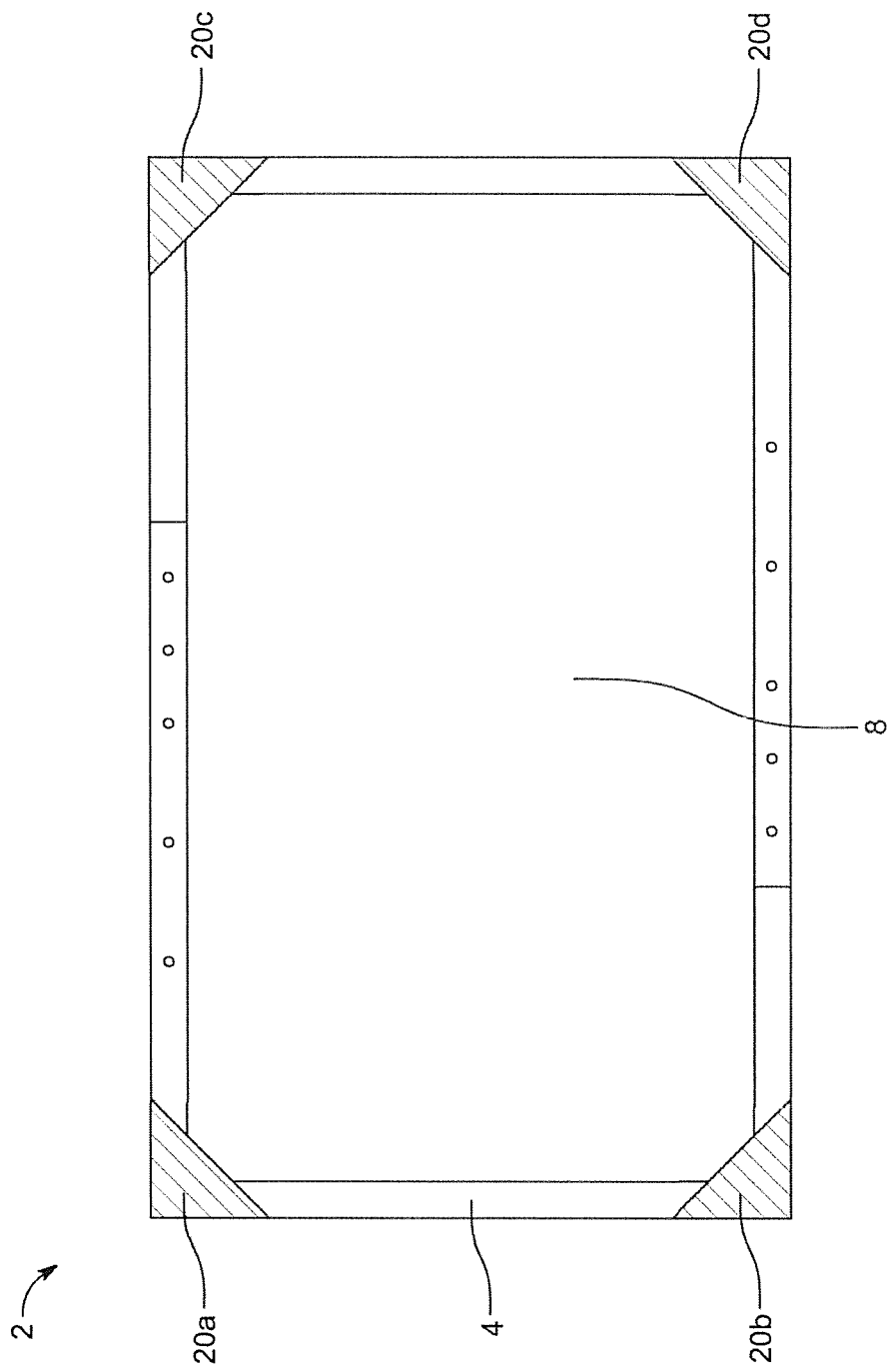
FIG. 5 is a rear elevation view of an air filter device according to one embodiment of the present disclosure.

FIG. 5 is a front elevation view of an air filter device 2 comprising a frame member 4 and a filter element 8 extending in a space defined by the frame member 4. The filter element comprises at least one and preferably a plurality of corner members 20a, 20b, 20c, 20d to secure the filter element 8 to the frame member 4. In certain embodiments, at least one of the corner members comprises elastic or a textile with elastic threads provided therein. The corner members may be stretched and/or shaped around the corners of the frame member 4 as shown in FIG. 5. In alternative embodiments, other areas or portions of the filter element 8 comprises elastic features such that the filter element 8 may be stretched and secured to the frame member 4. In certain embodiment, support members are provided and are attached to the frame through the filter space 8. Support members may include, for example, rigid supports extending between frame members and/or cord(s) to keep the filter from deforming or bulging out of the space defined by the frame member.

Figure 6:
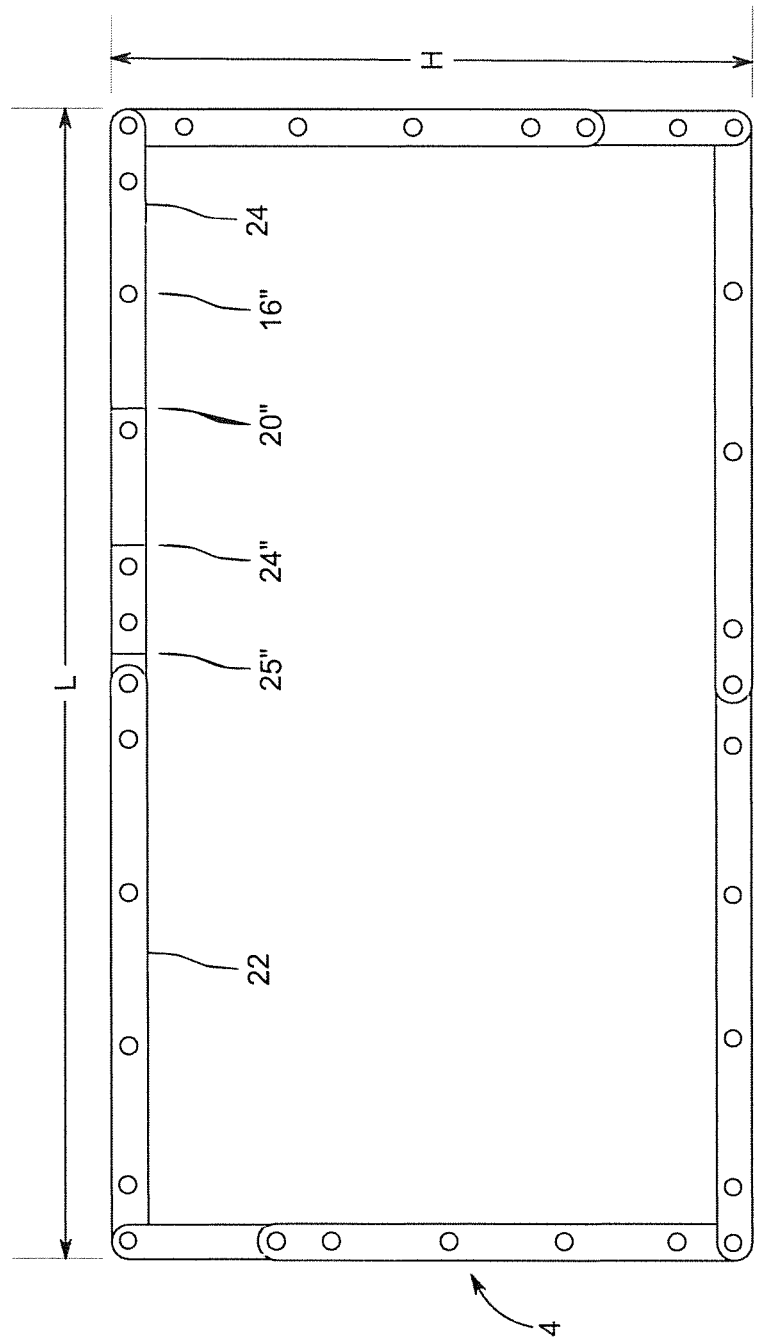
FIG. 6 is a front elevation view of an air filter device according to one embodiment of the present disclosure.

FIG. 6 is a front elevation view of a frame member 4 provided without a filter element for illustration purposes. The frame member 4 of FIG. 6 comprises a frame member wherein at least one the length L and the height H of the frame 4 is selectively adjustable. In the embodiment shown in FIG. 6, a frame portion extending in the length direction L comprises a first member 22 and second member 24. A length L of the frame is adjustable by adjustment of a relative positioning of the first member 22 and the second member 24, as shown and described herein. Various securing members and features for fixing the first member 22 and the second member 24 in desired position(s) may be provided. In the depicted embodiment, indicia are provided to indicate to a user one or more specific lengths. For example, as it is contemplated that air filtration devices of the present disclosure are to be provided in pre-existing duct work, various lengths may be indicated on one or both of the first member 22 and the second member 24. In the depicted embodiment of FIG. 6, indicia are provided at relative positions comprising or corresponding to lengths of 16 inches, 20 inches, 24 inches and 25 inches, for example. Such dimensions are known to correspond to existing duct work and/or slots and cradles intended to receive a filtration device. The height dimension H of the frame member 4 is adjustable in a similar manner.

Figure 7:
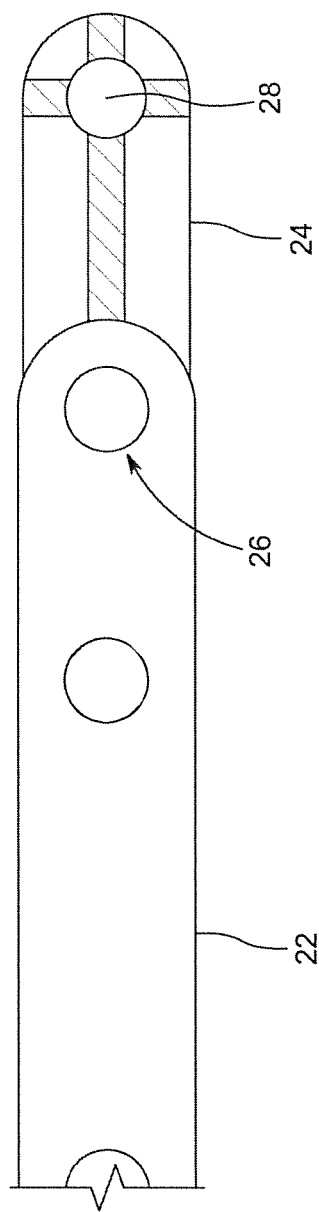
FIG. 7 is a detailed front elevation view of a portion of the device of FIG. 6.

FIG. 7 is a detailed view of a portion of a frame member 4 according to the embodiment of FIG. 6. As shown, a portion of a first frame member 22 and a second frame member 24 are provided. In the depicted embodiment, the first member 22 comprises a width that is larger than a width of the second member and wherein the first member 22 extends over or receives the second member 24. The first member comprises at least one aperture 26, and the second member 24 comprises at least one protrusion 28. The protrusion 28 is depicted as a hemispherical protrusion in FIG. 7, but one of ordinary skill in the art will recognize that any number of geometric shapes is contemplated for use as a protrusion. In various embodiments, biasing locking members are provided on a portion of the frame to provide for telescoping frame members that are selectively securable in a desired relative position. Such features include, but are not limited to, those described in U.S. Pat. No. 6,302,250 to Sadow et al., which is hereby incorporated by reference in its entirety.

Figure 8:
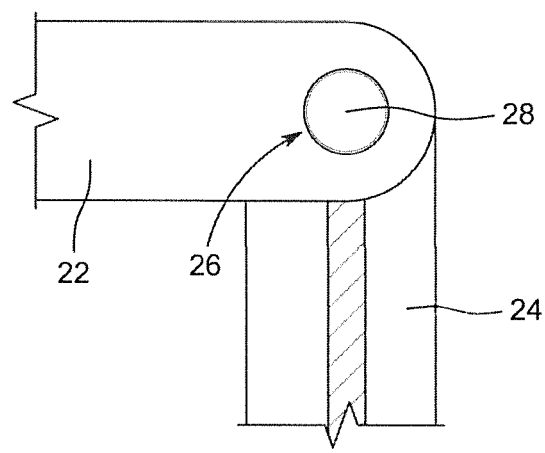
FIG. 8 is a detailed front elevation view of a portion of the device of FIG. 6.

FIG. 8 is a detailed elevation view of the frame member 4 according to FIGS. 6-7. As shown in FIG. 8, a first member 22 and a second member 24 are provided at a right angle and wherein the first member 22 extends in a length direction and the second member 24 extends in a height direction of the frame member 4. A male protrusion 28 is shown as extending at least partially into the aperture 26, wherein the aperture 26 is provided on the first member 22 and the protrusion 28 is provided on the second member 24. Accordingly, the present disclosure contemplates providing one or more frame members 4 that are selectively adjustable and which may be modified based on user preference and/or the size and shape a specific receiving feature for a frame member 4 and associated filter device.

Figure 9:
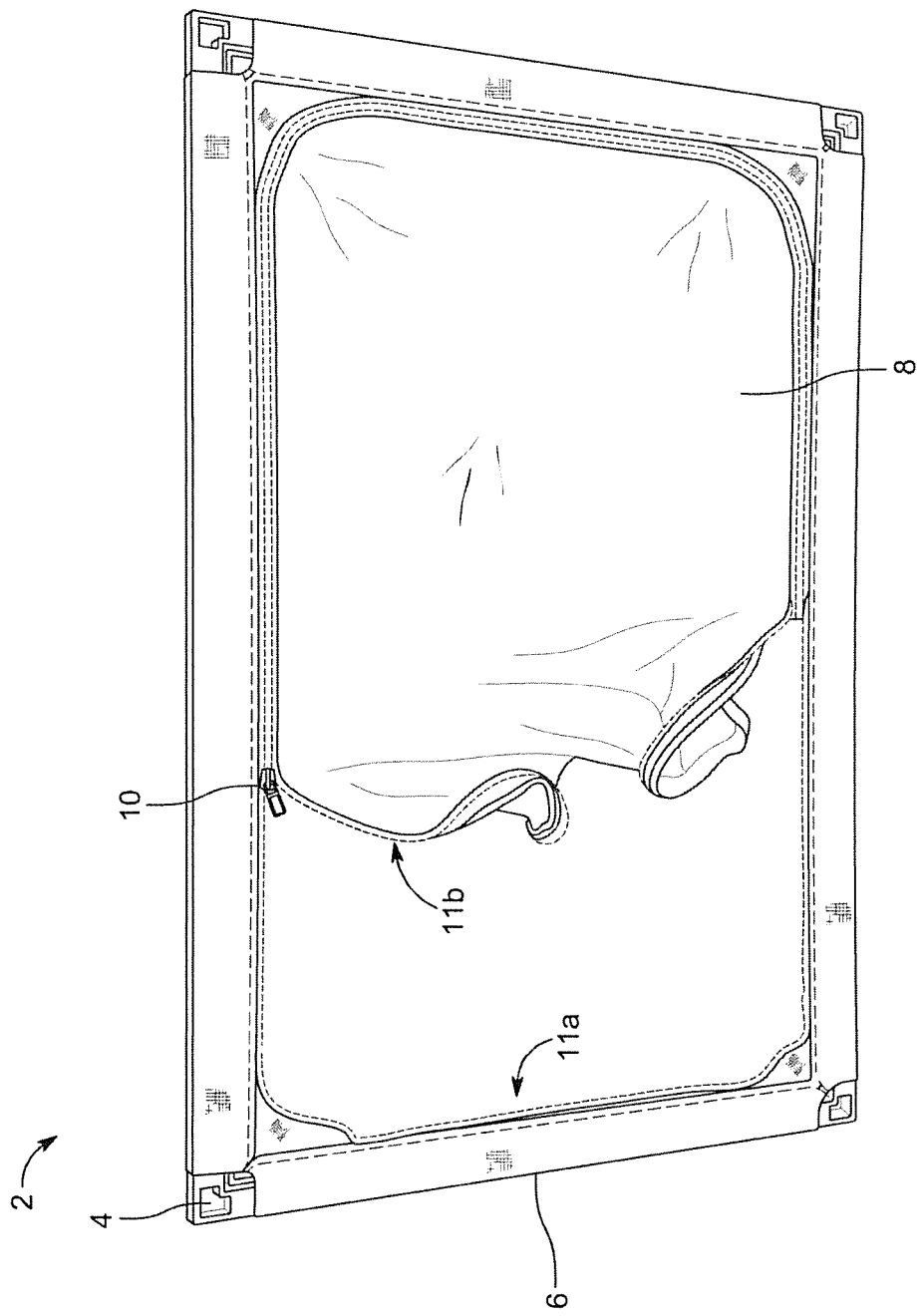
FIG. 9 is a perspective view of an air filter device according to one embodiment of the present disclosure.

FIG. 9 is a front elevation view of an air filter device 2 according to one embodiment of the present disclosure. As shown, the air filter device comprises a frame member 4, a cover member 6, and a filter element 8. The filter element 8 generally extends in an interior space or area defined by the frame member 4. The filter element 8 is secured to the cover member 6, and in turn to the frame member 4 by a zipper 10. The zipper 10 comprises a conventional zipper including a pull tab and first and second zipper member 11a, 11b. The filter element 8 comprises a flexible or pliable member that is removable from a remainder of the device by means of the zipper 10. Once removed, the filter element 8 may be cleaned by means of conventional laundry equipment, and replaced. The filter element 8 may also be replaced with a new filter element when desired.

Figure 10:
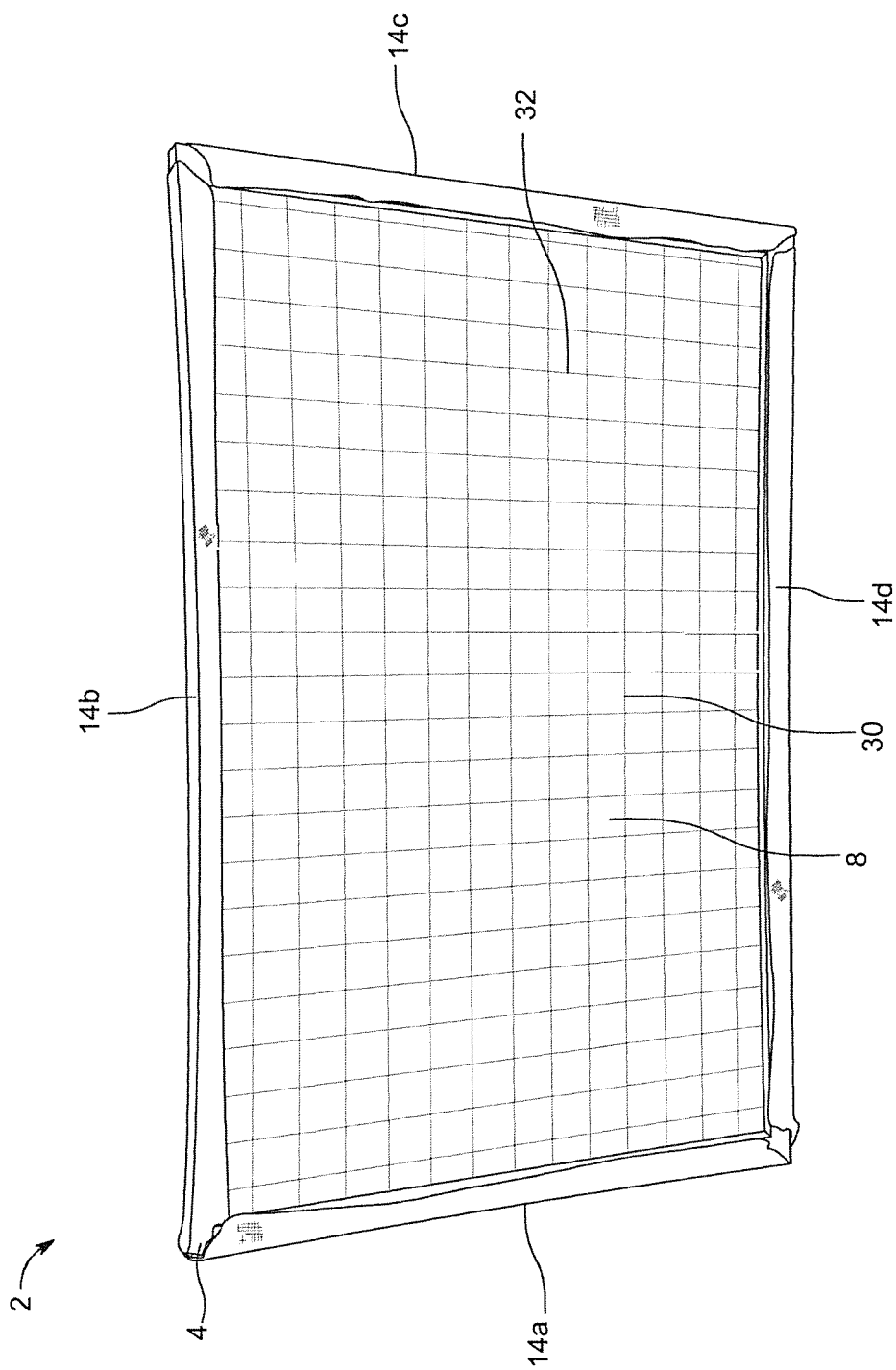
FIG. 10 is a perspective view of an air filter device according to one embodiment of the present disclosure.

FIG. 10 is a front elevation view of an air filter device 2 according to one embodiment of the present disclosure. As shown, the device 2 comprises a frame member 4 and a filter element 8. The filter element comprises a plurality of tabs or extensions 14a, 14b, 14c, 14d that extend or wrap around at least a portion of the frame 4. The tabs 14a, 14b, 14c, 14d are secured to the frame member by means of one or more hook-and-loop closure members. As shown in FIG. 10, the frame member 4 comprises a plurality of support members including longitudinal support member 30 and lateral support members 32. The support members provide structure to the device and to the filter element 2 to prevent or minimize bowing or expansion of the filter element 8 when an air flow is provided therethrough. Support members, including the support members shown in FIG. 10 are contemplated as being provided in various frame elements shown and described herein even where such features are not shown and described with respect to specific frame elements or Figures.

Figure 11:
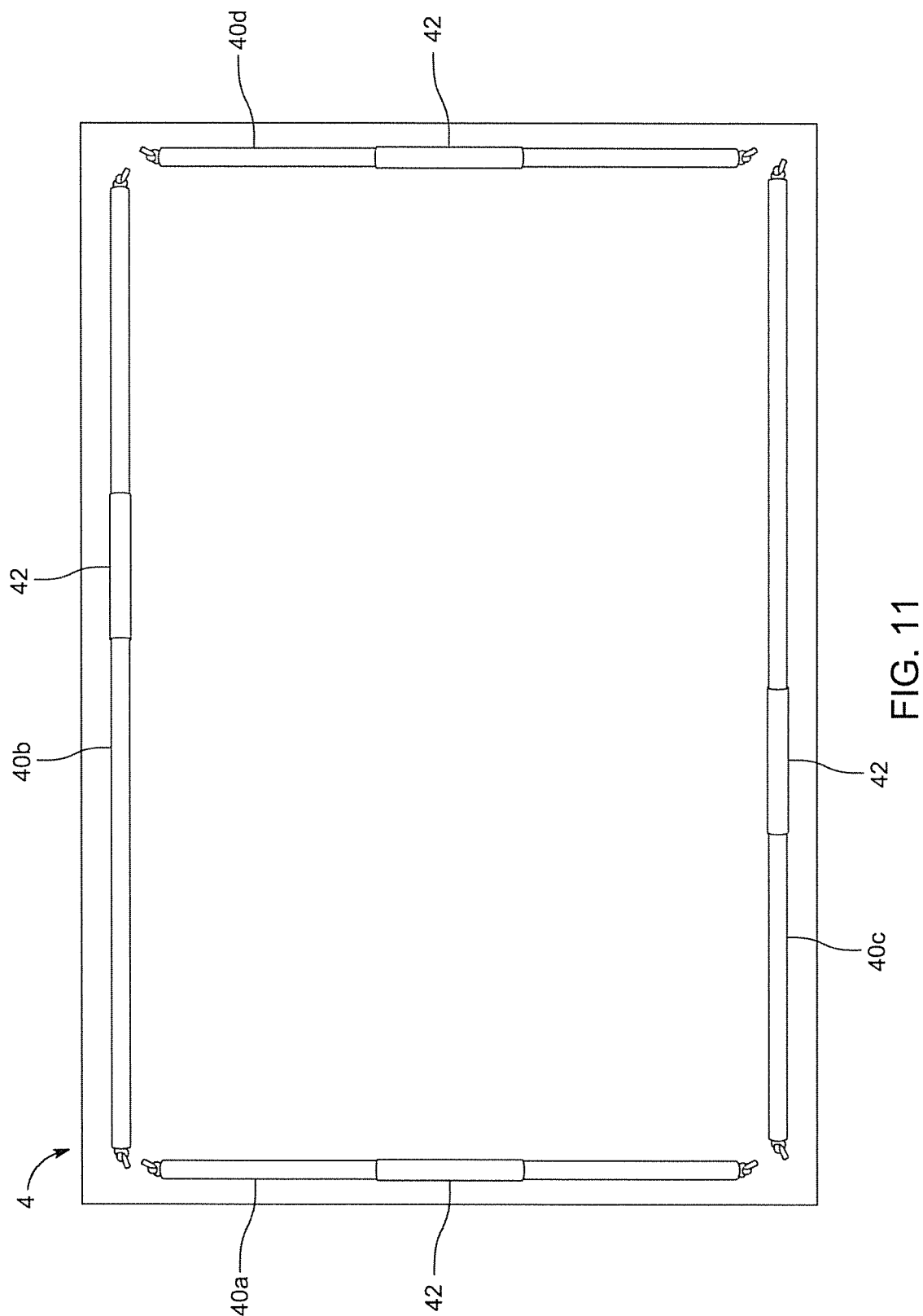
FIG. 11 is a front elevation view of a frame member for an air filter device according to one embodiment of the present disclosure.

FIG. 11 is a front view of a frame member 4 according to one embodiment of the present disclosure. As shown, the frame member 4 comprises a plurality of elongate supports 40a, 40b, 40c, 40d. The elongate supports are contemplated as comprising fiberglass or plastic rod members, and may be provided in any number of lengths and/or diameters or widths. The elongate supports 40 are connected by collar members 42. Accordingly, the combination of a plurality of different sized supports and the collar members 42 provided a user with essentially limitless options for connecting members and creating a frame member 4 of a desired size. Such embodiments are particularly useful where a user will need to design or customize a frame member 4 for a filter element of various different sizes or applications.

Figure 12:
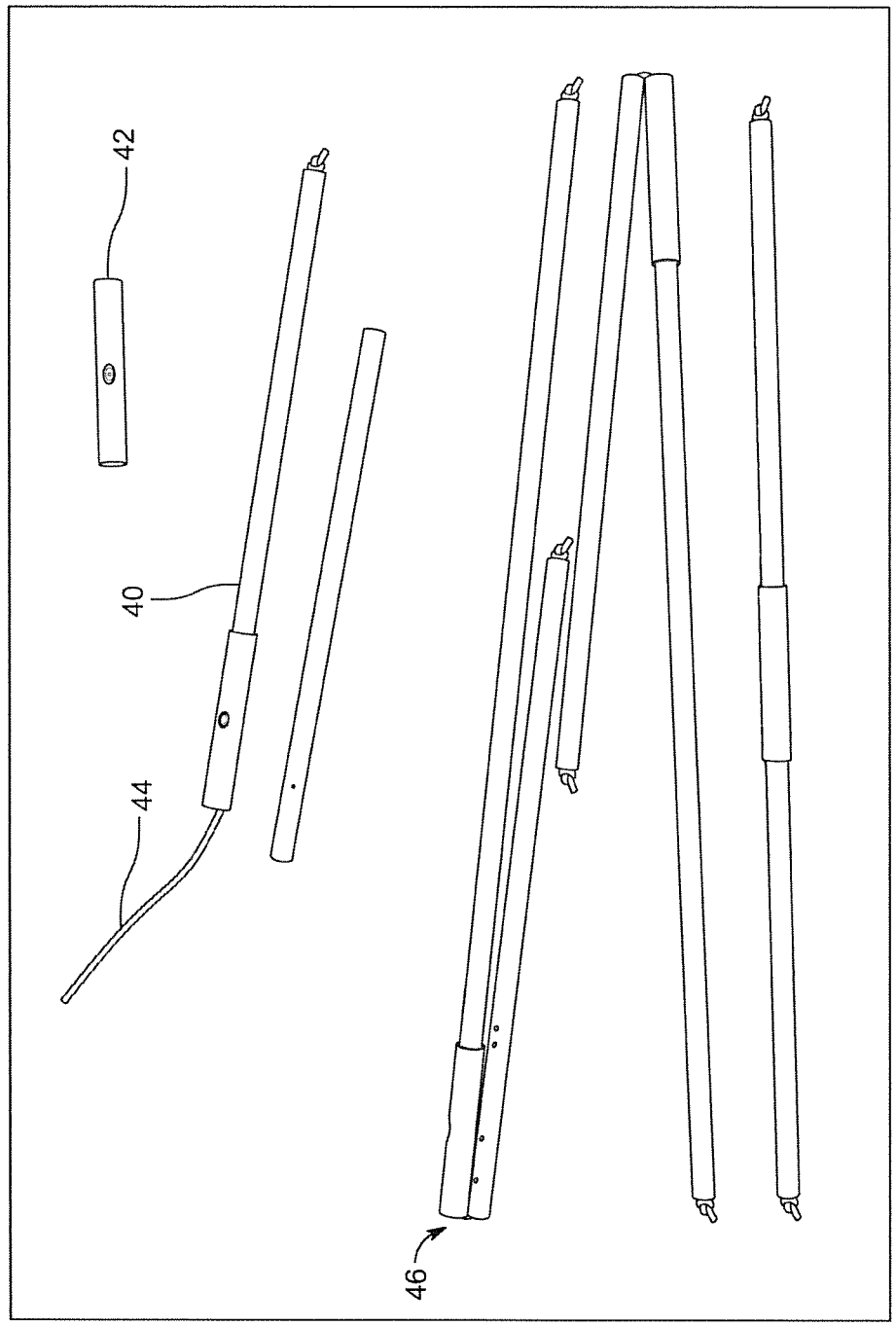
FIG. 12 is a view of a plurality of frame elements according to one embodiment of the present disclosure.

FIG. 12 is a view of a plurality of frame elements contemplated for use. As shown, a plurality of elongate frame supports 40 are provided. The elongate supports 40 are provided in various lengths, and may be secured to additional elongate supports by means of a collar 42. At least some elongate supports are provided that comprise an elastic element 44 within the support. The elastic element 44 allows a plurality of connected elongate supports to be taken apart and "folded" for storage, while maintaining a connection between the supports 40.

Figure 13:
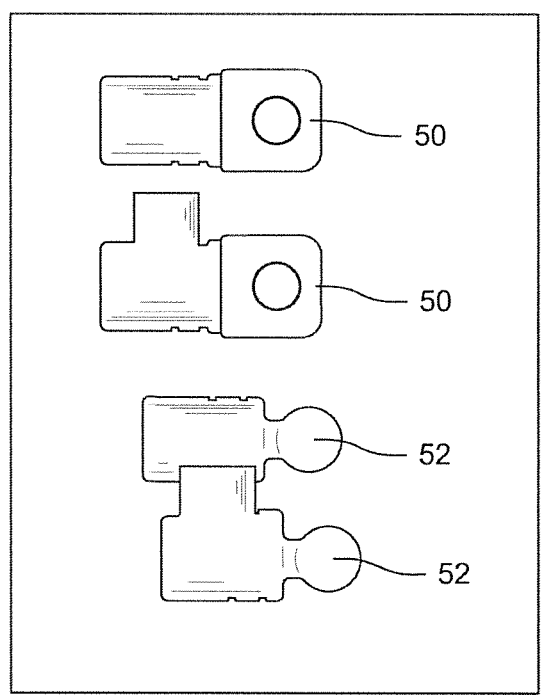
FIG. 13 is a view of a plurality of frame elements according to one embodiment of the present disclosure.

FIG. 13 is a front view of connector members 50, 52 that are contemplated for use in various embodiments of the present disclosure. The connector members comprise female connectors 50 and male connectors 52. Both connectors 50, 52 comprise a first end that is operable to press fit otherwise attached to an elongate support of a frame element (see 40 of FIGS. 11-12, for example). The connectors also comprise a second end. The second end of the male connector 52 comprises a ball or similar projection. The second end of the female connector 50 comprises an aperture, void or recess for receiving the ball of the male connector 52. The connectors 50, 52 are operable to be inserted into the elongate supports of the present disclosure and provide for the ability to connect adjacent elongate supports. For example, a male connector 52 and female connector 50 may be inserted into first and second elongate supports 40, respectively, and the first and second elongate supports may be connected at a right angle by inserting the ball of the male connector 52 into the aperture of the female connector 50 in a secure snap-fit manner.

Figure 14:
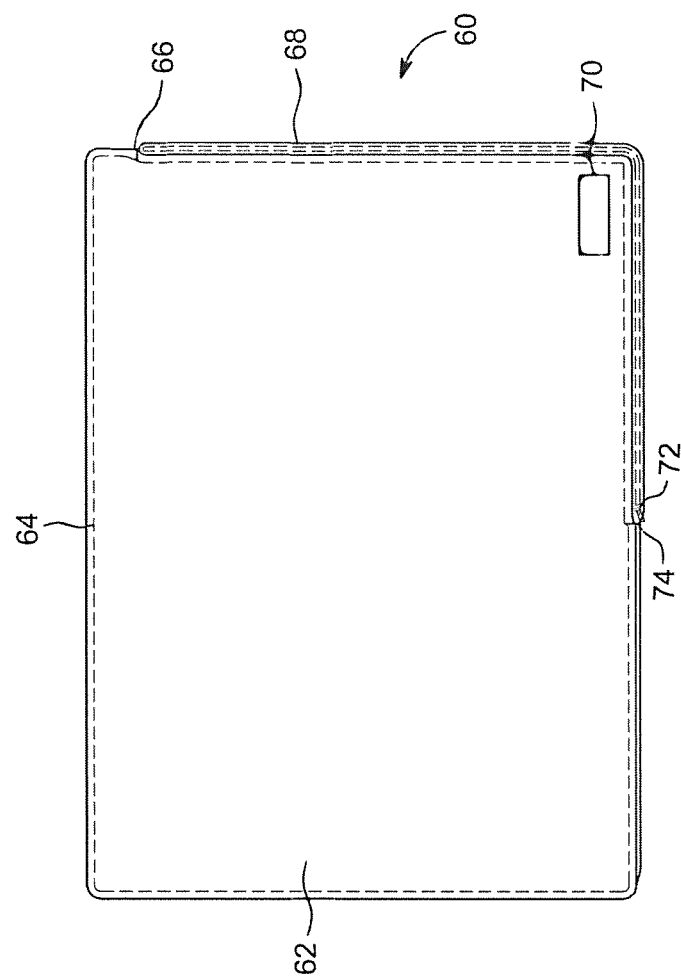
FIG. 14 is a front elevation view of an air filter device according to one embodiment of the present disclosure.

FIG. 14 is a front elevation view of a filter device 60 according to one embodiment of the present disclosure. As shown, the device 60 comprises a filter fabric with a first side 62, wherein the filter fabric preferably comprises a textile material. The textile may comprise, for example, a polyester mesh fabric that is machine-washable and machine-dryable. The filter device 60 further comprises stitching 64 to join a first side 62 and a second side of the filter fabric and create a substantially rectilinear cube device. A zipper 68 is provided that extends along at least two sides of the device 60. A zipper pull 72 is provided to operate and open and close an opening provided in the filter fabric, wherein a frame is inserted within the filter fabric to provide the shape shown in FIG. 14. The opening is preferably bar tack reinforced on first 66 and second 74 ends of the opening, with the zipper 68 extending therebetween. As further shown in FIG. 14, the device 60 further comprises a label or indicia 70. The indicia may comprise various information related to the device 60 including, but not limited to porosity of the filter, size of the filter, the date of last washing, etc.

Figure 15:
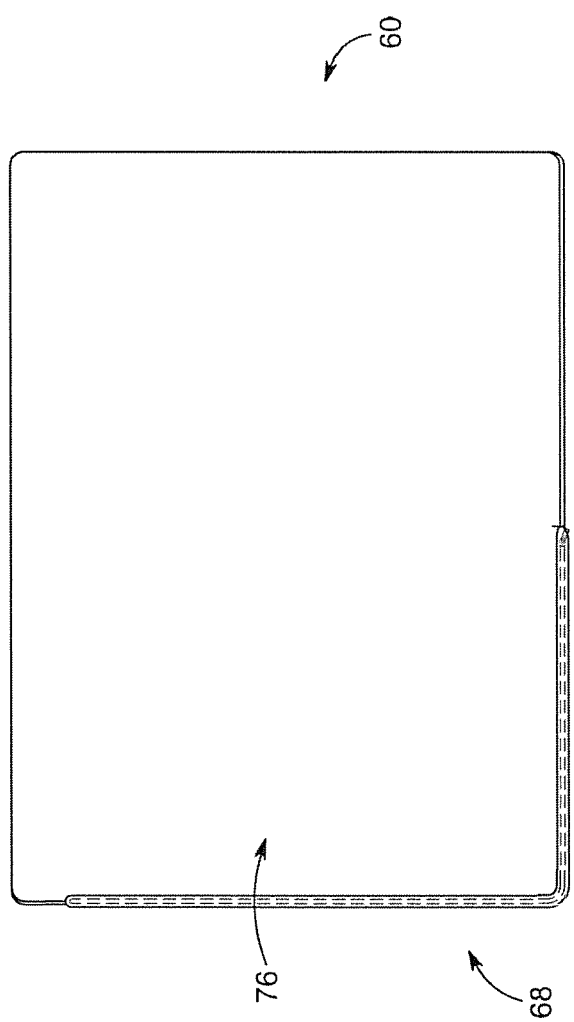
FIG. 15 is a rear elevation view of the air filter device according to the embodiment of FIG. 14.

FIG. 15 is a rear elevation view of the device 60 according to the embodiment of FIG. 14. As shown in FIG. 15, the device comprises a back side that comprises a filter fabric 76. In various embodiments, the first filter fabric 62 and the second filter fabric 76 comprise different filter fabrics. In the depicted embodiment, the first and second filter fabrics 62, 76 each comprise a polyester textile material and the second filter fabric 76 comprises a different color than the first filter fabric 62. The distinct coloring of the first side and second side of the filter fabric is operable to indicate to a user which side should be positioning facing upstream in an air flow, for example. As also shown in FIG. 15, an opening and associated zipper closure 68 is provided that extends along a portion of the height and a portion of the length of the device.

Figure 16:
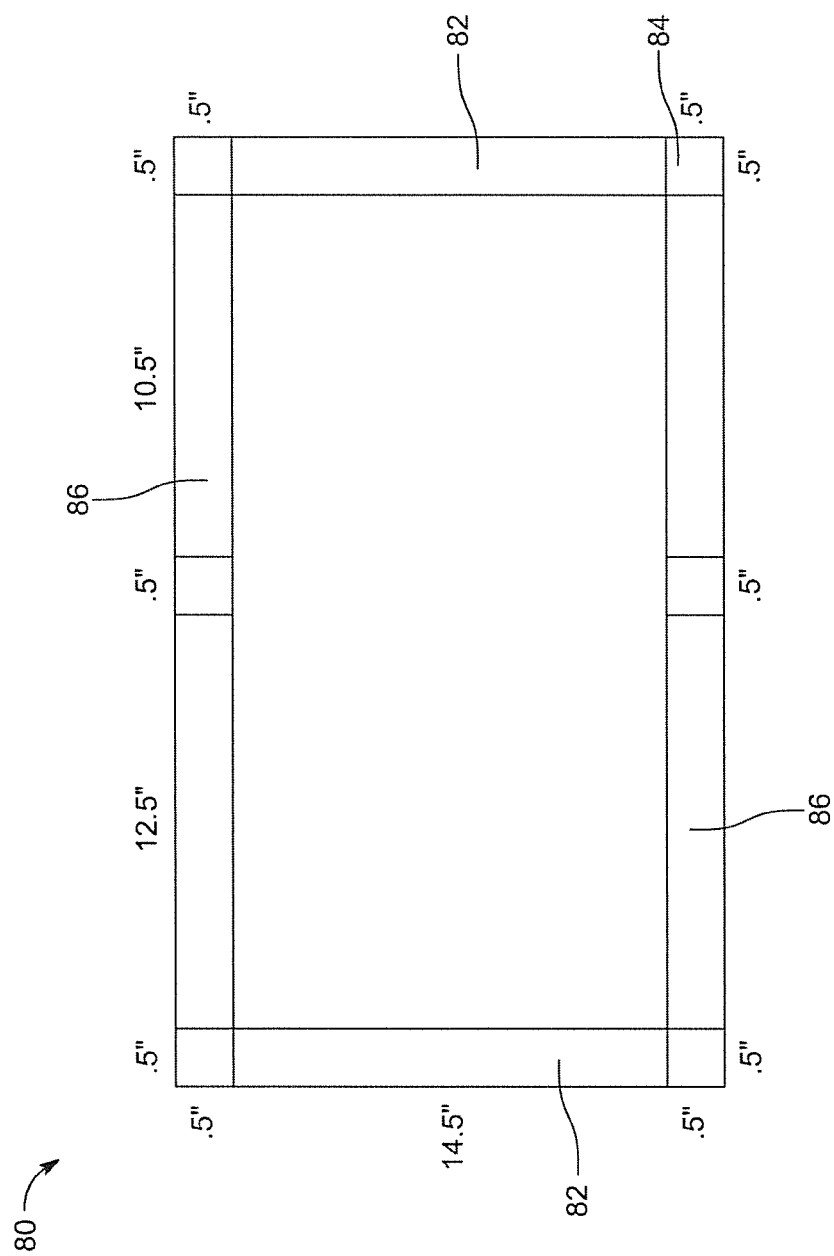
FIG. 16 is an elevation view of a frame element according to one embodiment of the present disclosure.

FIG. 16 is an elevation view of a frame 80 operable to be inserted into a filter member 60. As shown, the frame 80 comprises a plurality of selectively-connectable members and wherein the shape and size of the frame 80 may be varied based on the specific selection and combination of members that are assembled. As shown in FIG. 16, the frame 80 comprises at least one height member 82 and at least one length member 86. The device 80 also comprises a plurality of corner members 84 to connect the height and length members at right angles. Although not shown in FIG. 16, it is contemplated that the frame members comprise one or more elastic cords provided therethrough, and wherein the cords are secured to the members to facilitate assembly and collapsing of the frame member. In such embodiments, construction and assembly of the frame member as shown in FIG. 16 generally comprises aligning the members and allowing the elasticity of the cord members to quickly connect, or assist in connecting, the elements 82, 84, 86.

Figure 17A:
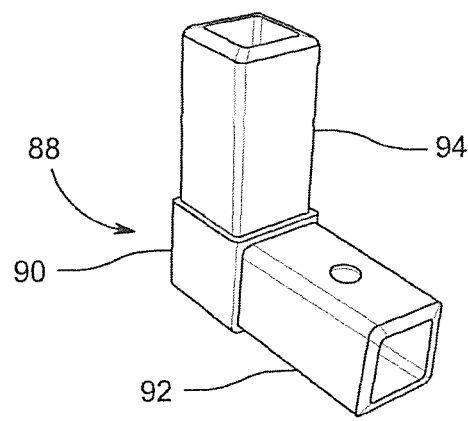
FIG. 17A is perspective view of a frame member according to one embodiment of the present disclosure.

FIG. 17A is a perspective view of a frame member 88 that comprises a right-angle frame member suitable for use in a corner of a frame. The frame member 88 comprises a joint or center portion 90 with at least one extending shelf or flange, and first and second extensions 92, 94. The first and second extensions 92, 94 extend substantially perpendicularly to one another and are operable to receive and/or be received by an extension of another element (see FIGS. 17B-17C, for example). The frame member 88 comprises a single component or building block of a frame element and is preferably provided as a corner piece.

Figure 17B:
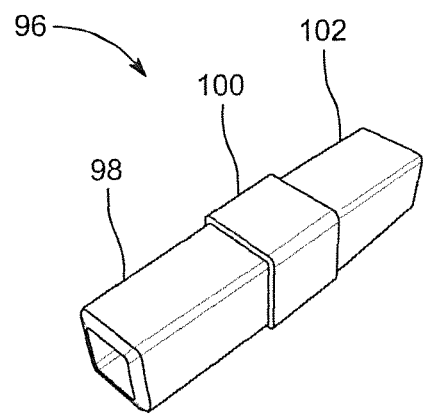
FIG. 17B is perspective view of a frame member according to one embodiment of the present disclosure.

FIG. 17B is a perspective view of a frame member 96 comprising a straight member operable to connect additional members and which is useful in the construction of a filter frame (see FIG. 16, for example). The frame member 96 of FIG. 17B comprises a joint member 100 that comprises a protrusion with at least one flange, and first and second extensions 98, 102 extending therefrom. The joint member 100, and extensions 98, 102 preferably comprise coaxial elements. The extensions 98, 102 are sized such that they are operable to be received within and/or receive an additional member for creating a frame size.

Figure 17C:
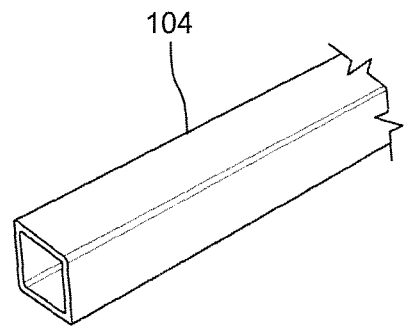
FIG. 17C is perspective view of a frame member according to one embodiment of the present disclosure.

FIG. 17C depicts a frame member 104 that comprises a rectilinear cube. The member 104 is preferably hollow and is operable to receive the extensions 92, 94, 98, 102 as shown in FIGS. 17A-17B, for example. One of ordinary skill in the art will recognize that various sizes and orientations. Any number of members 88, 96, 104 as shown and described may be provided to form the appropriate frame member and size.

Figure 18:
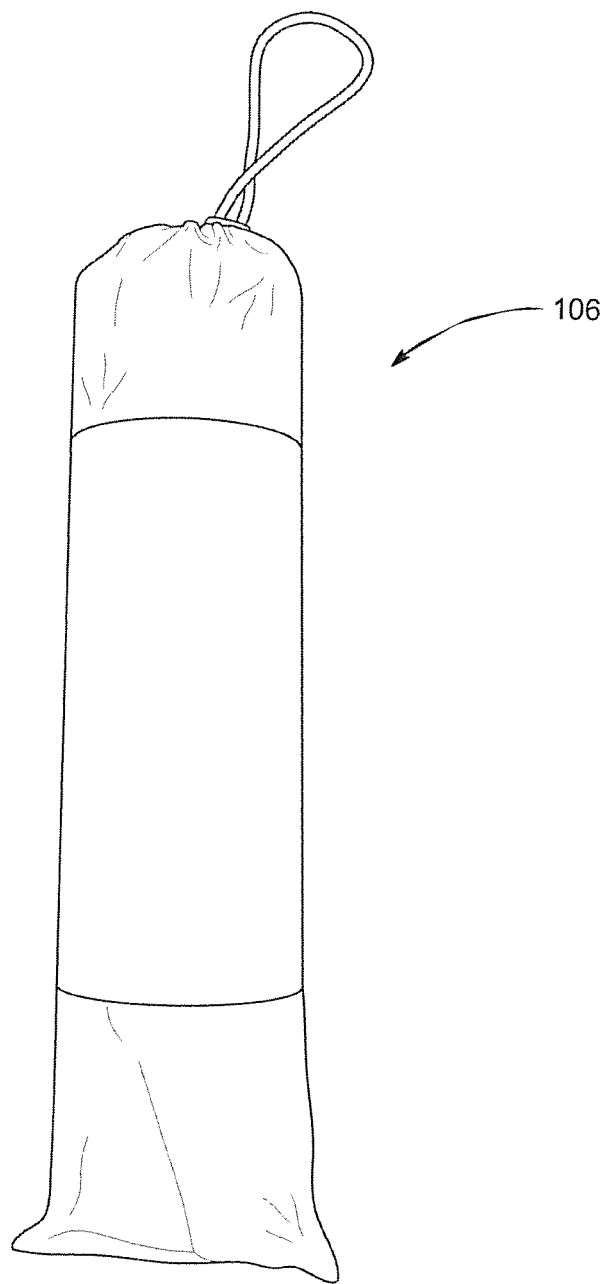
FIG. 18 is a perspective view of a packaging assembly for an air filter device according to one embodiment of the present disclosure.

FIG. 18 is a perspective view of a packaging assembly for a filter element according to one embodiment of the present disclosure. As shown, a bag 106 or pouch is provided that receives and stores a filter element (see 60 of FIG. 14, for example), and wherein the filter element comprises a filter fabric 62, 76, and a frame 80. In order to provide the packaged assembly of FIG. 18, the filter fabric is preferably removed from the frame 80, which is then disassembled. The components of the filter element are then preferably rolled or stuffed and provided in the packaged state shown in FIG. 18. The packaged assembly of FIG. 18 is adapted to be easily stored, shipped, and displayed for sale.

Figure 19:
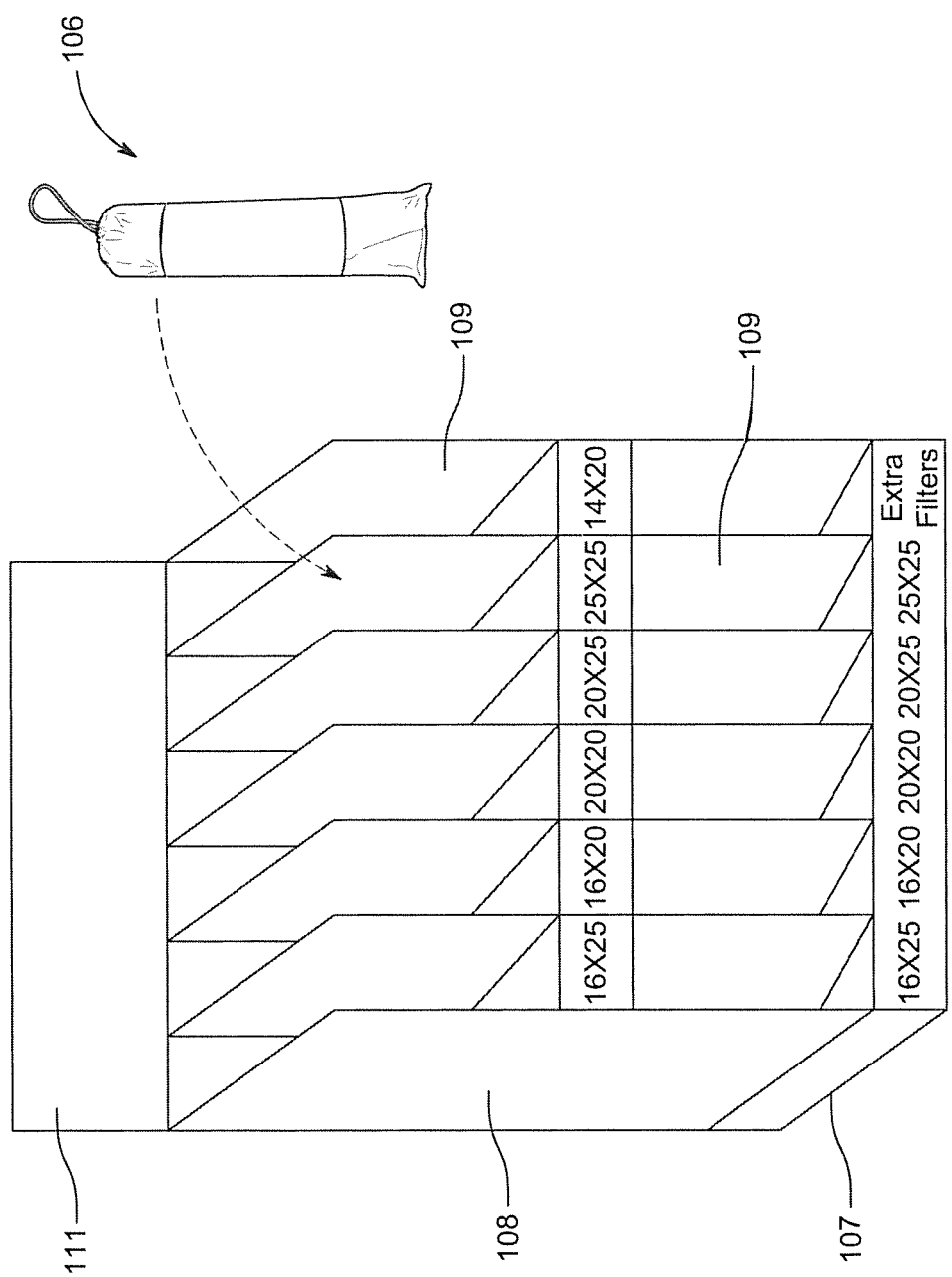
FIG. 19 is a perspective view of a packaging and display assembly according to one embodiment of the present disclosure.

FIG. 19 is a perspective view of a packaging and display assembly 108 suitable for use with embodiments of the present disclosure. As shown, the display assembly 108 comprises a base member 107 and a plurality of compartments 109. A backer or display panel 111 is provided and is operable to display information to a shopper, for example. The display panel 111 is shown as extending vertically above a plurality of compartments 109. The display panel 111 may also be positioned along the sides or bottom of the assembly 108. Additionally, it is contemplated that a plurality of display panels 111 are provided. The compartments 109 preferably correspond to filter elements of different sizes for ease of sorting and selecting. Alternatively, the compartments 109 may be provided simply for organizational purposes.

Figure 20:
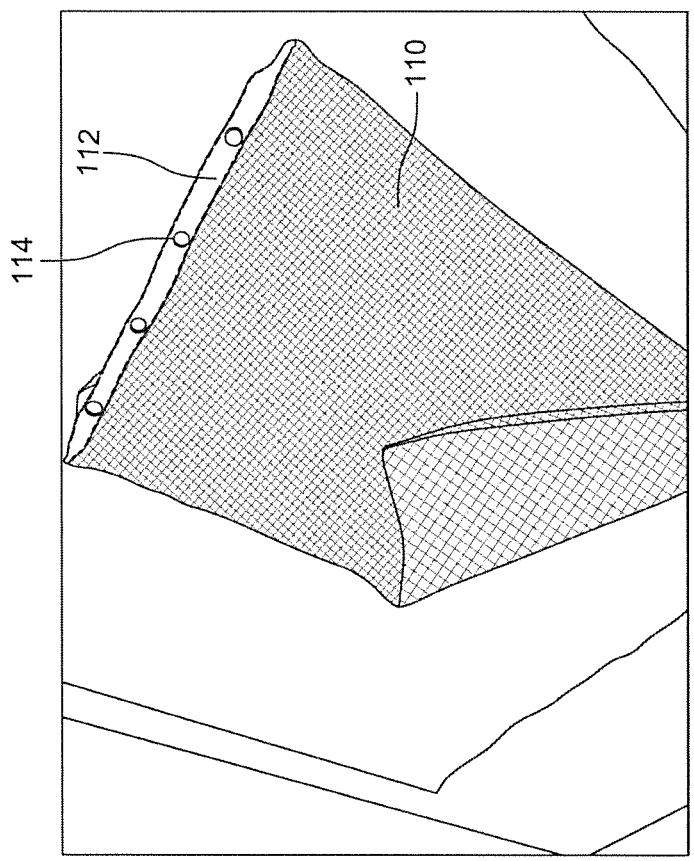
FIG. 20 is perspective view of a filter device according to one embodiment of the present disclosure.

FIG. 20 is a perspective view of a filter device 110 according to one embodiment of the present disclosure. The filter device 110 of FIG. 20 comprises a similar construction to the device shown and described with respect to FIG. 14, but wherein a closure member comprises a plurality of snaps 114 extending along and operable to selectively close an opening 112 provided on one end of the device 110. The snaps 114 are operable to selectively open and close the opening 112, and thereby facilitate removal of the filter fabric from the frame member (not shown in FIG. 20).

Figure 21:
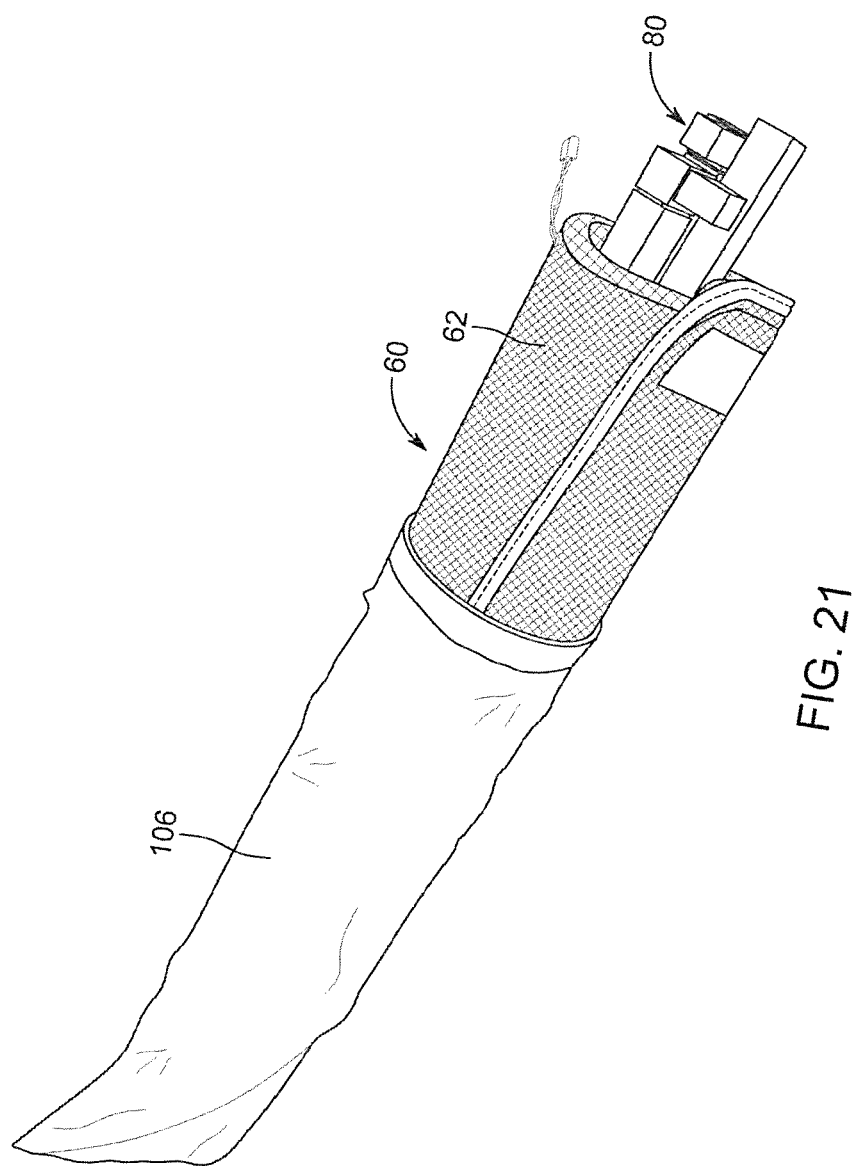
FIG. 21 is perspective view of a filter device according to one embodiment of the present disclosure.
Figure 22:
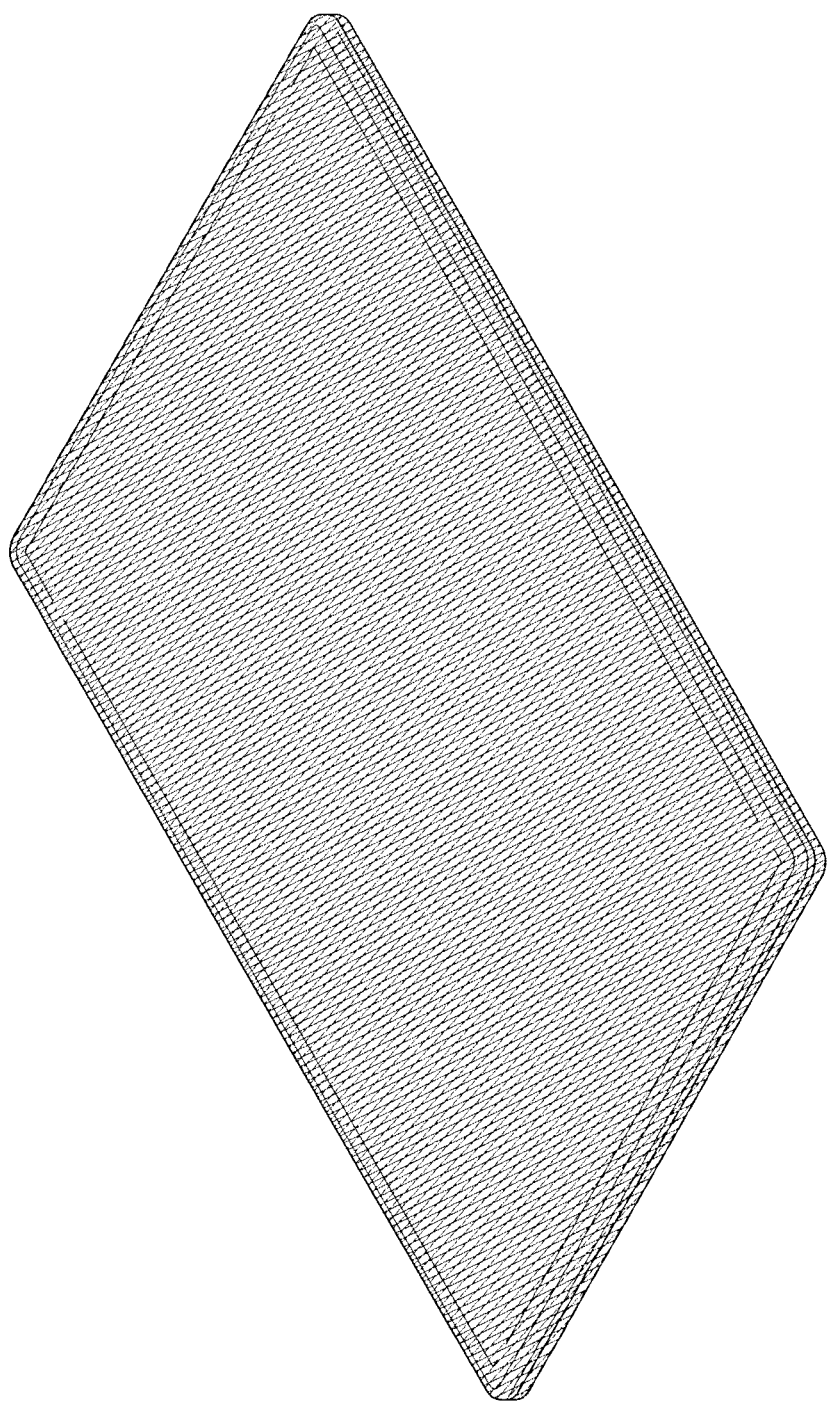
FIG. 22 is a perspective view of a filter device according to one embodiment of the present disclosure.
Figure 23:
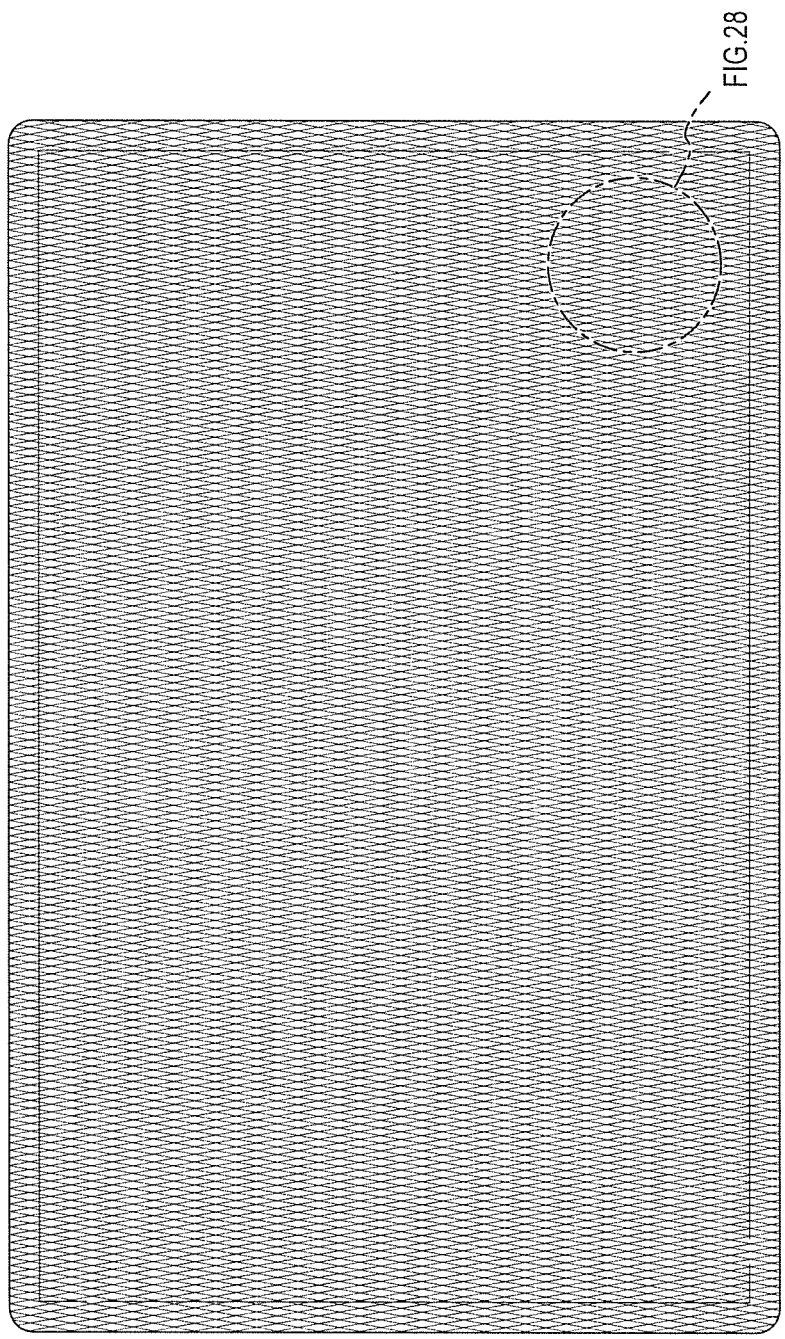
FIG. 23 is front elevation view of the filter device according to FIG. 22.
Figure 24:
FIG. 24 is a left side elevation view of the filter device according to FIG. 22.

FIG. 21 is a perspective view of a filter device 60 provided partially within a packaging device or bag 106. As shown, a deconstructed frame element 80 is provided. The filter fabric portion 62 is wrapped around the frame element 80, and the filter device 60 is inserted into the bag 106 for storing, shipping, selling, etc. The bag 106 preferably comprises a lightweight material that is substantially seals or insulates contents from dust, debris, moisture, etc.

Figure 25:
FIG. 25 is a right side elevation view of the filter device according to FIG. 22.
Figure 26:
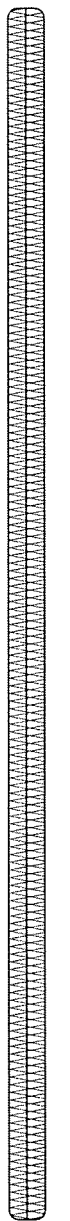
FIG. 26 is a top plan view of the filter device according to FIG. 22.
Figure 27:
FIG. 27 is a bottom plan view of the filter device according to FIG. 22.
Figure 28:
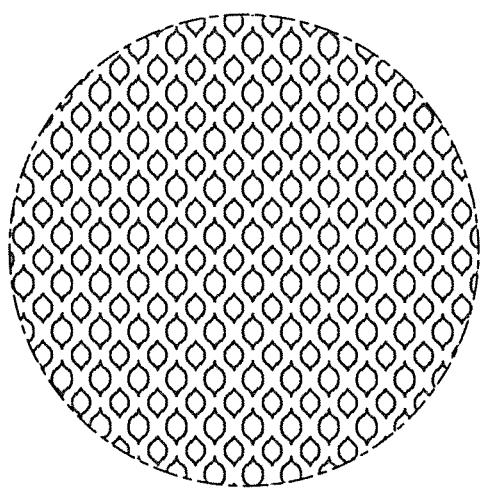
FIG. 28 is a detailed view of the surface texture of the filter device according to FIG. 28.
Figure 29:
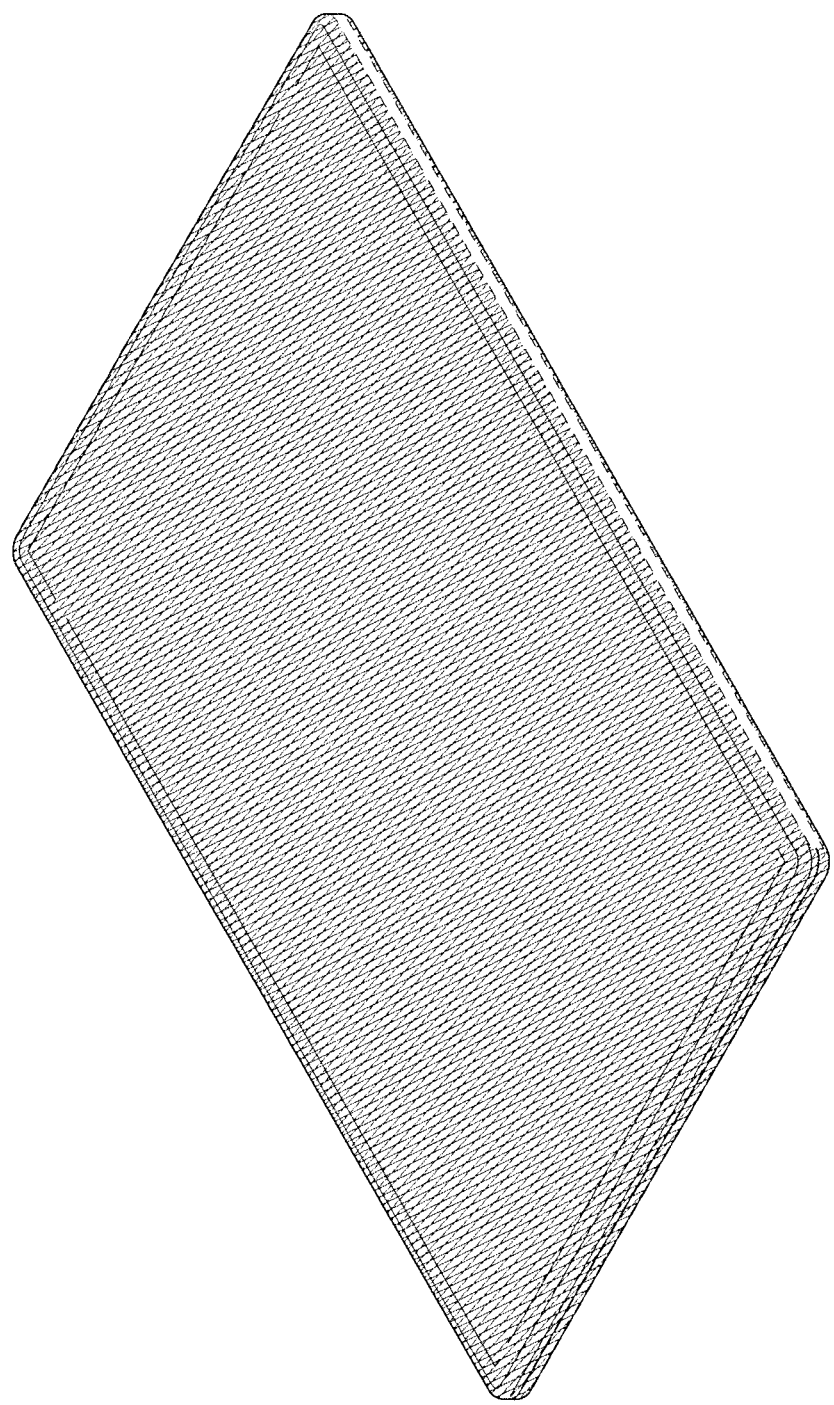
FIG. 29 is a perspective view of a filter device according to one embodiment of the present disclosure.
Figure 30:
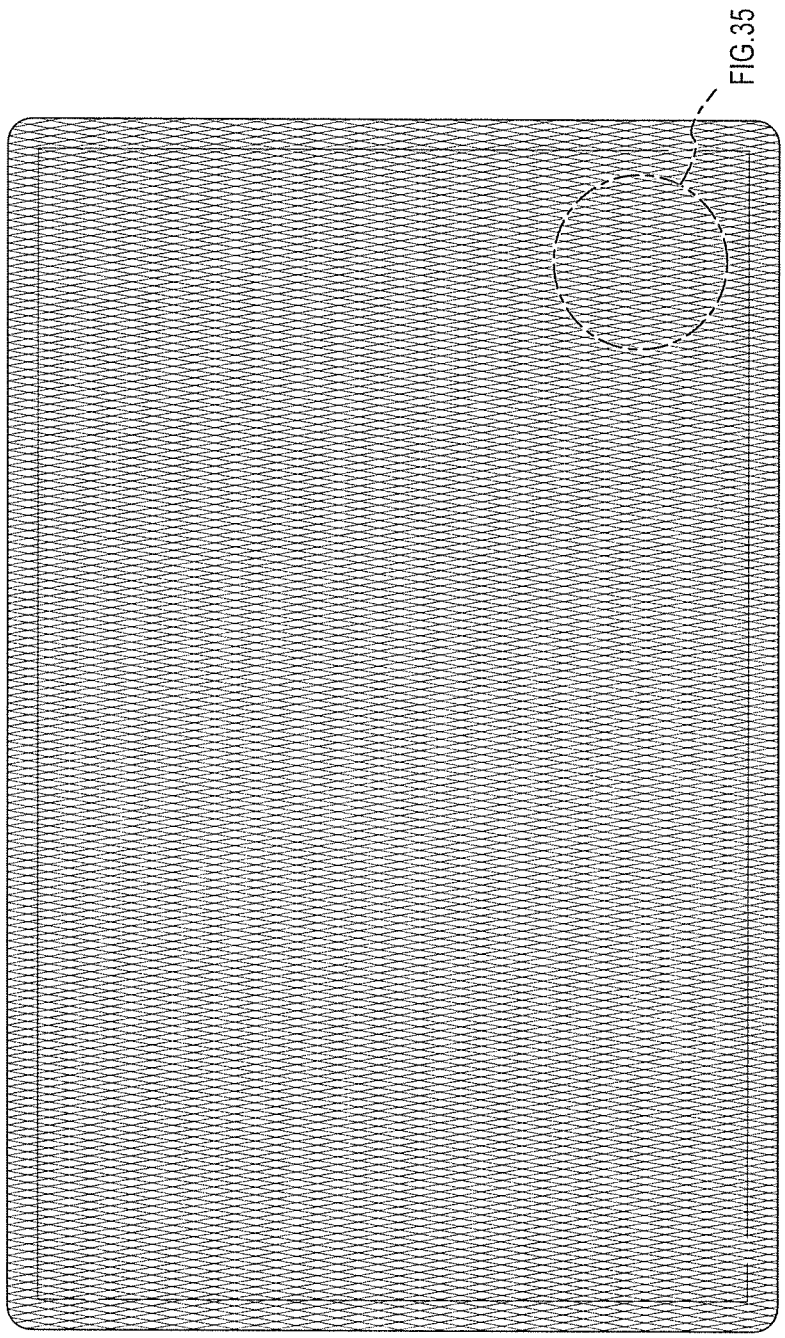
FIG. 30 is front elevation view of the filter device according to FIG. 29.
Figure 31:
FIG. 31 is a left side elevation view of the filter device according to FIG. 29.
Figure 32:
FIG. 32 is a right side elevation view of the filter device according to FIG. 29.
Figure 33:
FIG. 33 is a top plan view of the filter device according to FIG. 29.

FIGS. 22-28 provide various view of an air filtration device according to another embodiment of the present disclosure. An opening is provided on a side of the device (FIG. 25). The opening may comprise various fastening and closure mechanisms including, but not limited to a zipper, snaps, hook-and-loop closures, etc. The filter fabric is shown in detail in FIG. 28, and preferably comprises a spacer mesh fabric.

Figure 34:
FIG. 34 is a bottom plan view of the filter device according to FIG. 29.
Figure 35:
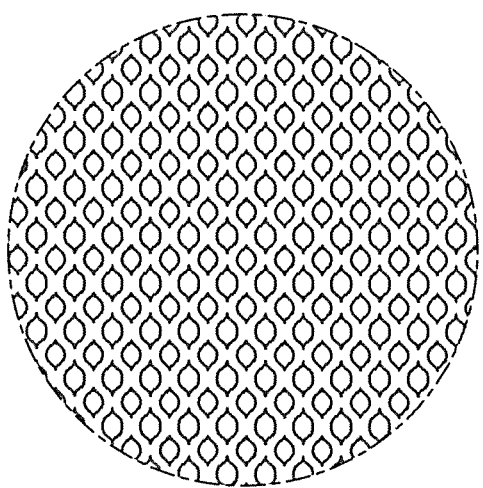
FIG. 35 is a detailed view of the surface texture of the filter device according to FIG. 28.

FIGS. 29-35 provide various view of an air filtration device according to another embodiment of the present disclosure. An opening is provided along a length of the device (FIG. 34). The opening may comprise various fastening and closure mechanisms including, but not limited to a zipper, snaps, hook-and-loop closures, etc. The filter fabric is shown in detail in FIG. 35, and preferably comprises a spacer mesh fabric.

Various components and features shown and described herein are specifically contemplated as being provided in any of the embodiments disclosed herein. For example, features that may be shown and described with respect to a particular Figure or embodiment should not be viewed as being limited to only that Figure or embodiment. Such features are considered to be interchangeable between embodiments as will be recognized by one of ordinary skill in the art. By disclosing and/or describing a feature with respect to one embodiment or certain embodiments, no limitation is suggested or provided therewith.

Although various embodiments comprising various features are shown and described herein, it should be understood that the various features of the present disclosure are not exclusive or specific to the embodiment or embodiments they are shown and described in connection with. For example, the illustration and description of one or more features with respect to a specific embodiment should not be interpreted as rendering such a feature or features specific to that embodiment. Features and inventive concepts shown in a given Figure may be combined with or provided with the embodiments of other features, whether or not such combinations are specifically illustrated herein.

What is claimed is:

1. An air filtration device, comprising: a frame comprising a length and height;
   the frame comprising a plurality of selectively interconnectable frame members that form a substantially rectilinear frame when provided in an assembled state;
   the selectively interconnectable frame members comprising at least one elastic cord to facilitate assembly of the frame;
   the frame at least partially defining an air flow path when provided in an assembled state;
   a substantially rectangular filter member comprising a flexible textile material, a first side, a second side, a length, a height, and an internal volume provided between the first side and the second side;
   wherein the length and the height of the filter member are equal to or greater than the length and the height of the frame and the frame is operable to be received within the filter member;
   the filter member further comprising an opening providing access to the internal volume of the filter member wherein the opening is sized and operable to receive the frame such that the frame is operable to be provided within the internal volume of the filter member;
   wherein the filter member comprises at least one closure member operable to close the opening when the frame is located in the internal volume of the filter member and to open the opening so that the frame can be separated from the internal volume of the filter member, wherein the closure member is attached to the filter member when the frame is separated from the internal volume of the filter member.

2. The air filtration device of claim 1, wherein the filter member comprises a washable and reusable filter member.

3. The air filtration device of claim 1, wherein the flexible textile material comprises a material selected from the group consisting of: polyester, cotton, wool, bamboo, acrylic, nylon, rayon, spandex, acetate, lastex, orlon and Kevlar.

4. The air filtration device of claim 1, wherein the closure member comprises a zipper.

5. The air filtration device of claim 4, wherein the zipper extends along each of the at least two adjacent, perpendicular sides of the filter member.

6. The air filtration device of claim 1, wherein the filtration device is sized to correspond to existing duct work intended to receive a filtration device.

* * * * *